US010872158B2

(12) United States Patent
Hayasaka et al.

(10) Patent No.: US 10,872,158 B2
(45) Date of Patent: Dec. 22, 2020

(54) SECRET SEARCH SYSTEM, SECRET SEARCH METHOD, AND COMPUTER READABLE MEDIUM

(71) Applicant: Mitsubishi Electric Corporation, Tokyo (JP)

(72) Inventors: Kenichiro Hayasaka, Tokyo (JP); Yutaka Kawai, Tokyo (JP); Takato Hirano, Tokyo (JP); Yoshihiro Koseki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 230 days.

(21) Appl. No.: 16/063,457

(22) PCT Filed: Jan. 11, 2017

(86) PCT No.: PCT/JP2017/000679
§ 371 (c)(1),
(2) Date: Jun. 18, 2018

(87) PCT Pub. No.: WO2017/122696
PCT Pub. Date: Jul. 20, 2017

(65) Prior Publication Data
US 2018/0365433 A1 Dec. 20, 2018

(30) Foreign Application Priority Data

Jan. 14, 2016 (WO) ................ PCT/US2016/051006
Oct. 4, 2016 (WO) .................. PCT/JP2016/079421

(51) Int. Cl.
*G06F 21/60* (2013.01)
*G06F 16/14* (2019.01)
(Continued)

(52) U.S. Cl.
CPC .......... *G06F 21/602* (2013.01); *G06F 16/148* (2019.01); *G06F 21/6227* (2013.01); *H04L 9/0861* (2013.01)

(58) Field of Classification Search
CPC .. G06F 21/602; G06F 16/148; G06F 21/6227; H04L 9/0861
See application file for complete search history.

(56) References Cited

U.S. PATENT DOCUMENTS 8,533,489 B2 * 9/2013 Roeder ..................... H04L 9/00
713/189
10,311,239 B2 * 6/2019 Tanishima ................ H04L 9/00
(Continued)

FOREIGN PATENT DOCUMENTS

EP      2960808 A1    12/2015
JP    2005-101883 A    4/2005
(Continued)

OTHER PUBLICATIONS

Extended European Search Report for European Application No. 17738450.0, dated Sep. 5, 2018.
(Continued)

Primary Examiner — Mohammed Waliullah
(74) Attorney, Agent, or Firm — Birch, Stewart, Kolasch & Birch, LLP

(57) ABSTRACT

A management apparatus (500) stores encrypted tags (C(D)) and encrypted data such that they are associated with each other. When a search apparatus (400) obtains a search keyword (s) for searching for encrypted data stored in the management apparatus (500), the search apparatus (400) calculates deterministic information (t) which is uniquely determined by the search keyword (s), and generates a search query (Q(s)) by performing encryption of a probabilistic encryption scheme on the search keyword (s) using the deterministic information (t). The search apparatus (400)
(Continued)

transmits the search query (Q(s)) to the management apparatus (500). When the management apparatus (500) receives the search query (Q(s)) from the search apparatus (400), the management apparatus (500) determines whether the search keyword (s) obtained by decrypting the search query (Q(s)) matches an associated keyword obtained by decrypting an encrypted tag (c) stored in the management apparatus (500).

18 Claims, 24 Drawing Sheets

(51) Int. Cl.
    *H04L 9/08*           (2006.01)
    *G06F 21/62*         (2013.01)

(56) References Cited

U.S. PATENT DOCUMENTS

| | | |
|---|---|---|
| 2005/0102499 A1 | 5/2005 | Kosuga et al. |
| 2012/0159180 A1 | 6/2012 | Chase et al. |
| 2013/0262863 A1 | 10/2013 | Yoshino et al. |
| 2013/0287210 A1 | 10/2013 | Matsuda et al. |
| 2013/0332729 A1 | 12/2013 | Ito et al. |
| 2014/0331044 A1 | 11/2014 | Fujii et al. |
| 2015/0046450 A1 | 2/2015 | Yoshino et al. |
| 2015/0371062 A1* | 12/2015 | Ito ................ G06F 21/6245 713/164 |
| 2015/0381578 A1 | 12/2015 | Thota et al. |
| 2016/0048690 A1 | 2/2016 | Tanishima et al. |
| 2016/0335450 A1 | 11/2016 | Yoshino et al. |
| 2017/0026350 A1* | 1/2017 | Dawoud ............... H04L 9/0637 |
| 2017/0288858 A1* | 10/2017 | Hirano ................. G06F 21/6218 |

FOREIGN PATENT DOCUMENTS

| | | |
|---|---|---|
| JP | 2005-134990 A | 5/2005 |
| JP | 2006-072585 A | 3/2006 |
| JP | 2006-113704 A | 4/2006 |
| JP | 2010-224655 A | 10/2010 |
| JP | 2012-123614 A | 6/2012 |
| JP | 2012-164031 A | 8/2012 |
| JP | 2013-152512 A | 8/2013 |
| JP | 2014-126621 A | 7/2014 |
| JP | 2015-035072 A | 2/2015 |
| JP | 2015-135541 A | 7/2015 |
| JP | 2016-143048 A | 8/2016 |
| WO | WO 2012/004880 A1 | 1/2012 |
| WO | WO 2012/095973 A1 | 7/2012 |
| WO | WO 2012/115031 A1 | 8/2012 |
| WO | WO 2013/080365 A1 | 6/2013 |
| WO | WO 2014/128958 A1 | 8/2014 |

OTHER PUBLICATIONS

Partial Supplementary European Search Report for European Application No. 16884955.2, dated Oct. 1, 2018.
Chase et al., "Substring-Searchable Symmetric Encryption"; Proceedings on Privacy Enhancing Technologies, vol. 2, 2015, pp. 263-281.
Curtmola et al., "Searchable Symmetric Encryption: Improved Definitions and Efficient Constructions", Journal of Computer Security, vol. 19, 2011, pp. 895-934.
Hahn et al., "Searchable Encryption with Secure and Efficient Updates", Proceedings of the ACM Conference on Computer and Communications Security, 2014, pp. 310-320.
International Search Report for PCT/JP2016/051006 (PCT/ISA/210) dated Apr. 5, 2016.
International Search Report for PCT/JP2016/051158 (PCT/ISA/210) dated Apr. 12, 2016.
International Search Report for PCT/JP2016/079421 (PCT/ISA/210) dated Dec. 27, 2016.
International Search Report for PCT/JP2017/000679 (PCT/ISA/210) dated Apr. 4, 2017.
Li et al., "Fuzzy Keyword Search over Encrypted Data in Cloud Computing", Proceedings of IEEE INFOCOM, 2010, 5 pages.
Wang et al., "Achieving Usable and Privacy-assured Similarity Search over Outsourced Cloud Data", Proceedings of IEEE INFOCOM, 2012, pp. 451-459.
Extended European Search Report for European Application No. 16884955.2, dated Feb. 7, 2019.
European Office Action dated Jan. 14, 2020, for European Application No. 16884955.2.
Office Action dated Aug. 19, 2020 in U.S. Appl. No. 16/061,264.
Office Action dated Oct. 28, 2020 in corresponding Indian Application No. 201847024068.
Office Action dated Oct. 30, 2020 in Chinese Application No. 201680076736.4 corresponding to co-pending U.S. Appl. No. 16/061,264.

\* cited by examiner

SECRET SEARCH SYSTEM, SECRET SEARCH METHOD, AND COMPUTER READABLE MEDIUM

TECHNICAL FIELD

The present invention relates to a secret search system, a secret search method, and a secret search program.

BACKGROUND ART

A secret search is a technique capable of searching for a file with the file being encrypted. In the present time where cloud services have begun spreading, cloud storage, the use of which can be started at low cost and with no trouble, has started to become commonplace. Here, due to concern about cracking or cloud reliability, it is considered that a file is encrypted and stored in cloud storage. The secret search is a technique capable of achieving both security and functionality because a search for an encrypted file can be performed without decrypting the file.

In the secret search, a search is implemented using two encrypted keywords. The first one is an encrypted keyword to be associated with an encrypted file, and is hereinafter referred to as encrypted tag. The second one is a keyword obtained by encrypting a keyword used for a search, and is hereinafter referred to as encrypted query or search query. In the secret search, by finding a matching encrypted tag in a set of encrypted tags using a search query and without decryption, a search is implemented without exposing a stored file or information about a search keyword.

For the secret search, there are a scheme using deterministic encryption that generates the same ciphertext for the same search keyword; and a scheme using probabilistic encryption that generates different ciphertexts even for the same search keyword. For a secret search using deterministic encryption in which search queries are deterministic, a distribution of search keywords can be obtained with the search keywords being encrypted, and thus, there is a possibility that a keyword may be guessed due to a bias in the distribution. Hence, a secret search using probabilistic encryption in which search queries are probabilistic has a high level of security compared to the secret search using deterministic encryption. However, the secret search in which search queries are probabilistic, on the other hand, has a problem that a search process is slow compared to the secret search in which search queries are deterministic.

For techniques for speeding up a secret search in which search queries are probabilistic, there are Patent Literatures 1 and 2. In addition, Non Patent Literature 1 describes, though it is a technique for speeding up a secret search in which search queries are deterministic, a technique for speeding up a re-search using the fact that search queries are deterministic. In addition, Non Patent Literature 2 discloses a technique for constructing encrypted tags that are highly resistant to frequency analysis attacks even if search queries are generated by deterministic encryption.

In Patent Literatures 1 and 2, a deterministic value that depends on a search keyword is included in an encrypted query and deterministic values are also similarly added to a set of encrypted tags, by which encrypted tags to be searched for are limited, speeding up a search process.

CITATION LIST

Patent Literature

Patent Literature 1: JP 2012-164031 A
Patent Literature 2: JP 2013-152512 A

Non Patent Literature

Non Patent Literature 1: F. Hahn and F. Kerschbaum. "Searchable Encryption with Secure and Efficient Updates". ACM CCS 2014.
Non Patent Literature 2: R. Curtmola et al., "Searchable Symmetric Encryption Improved Definitions and Efficient Constructions", ACM CCS 2006.

SUMMARY OF INVENTION

Technical Problem

In Patent Literatures 1 and 2, a deterministic value that depends on a search keyword is included in a search query and the deterministic value is also similarly added to a set of encrypted tags. Since a deterministic value that depends on a search keyword is thus included in a search query and encrypted tags, it cannot be said that the search query is probabilistic, and there is a problem that security decreases in exchange for the speeding up of a search process.

An object of the present invention is to provide a secret search system capable of embedding information for speeding up a search process in a probabilistic search query.

Solution to Problem

A secret search system according to the present invention includes:

a management apparatus including a management memory unit, and receiving encrypted data and an encrypted tag and storing, in the management memory unit, the encrypted tag and the encrypted data such that the encrypted tag and the encrypted data are associated with each other, the management memory unit being a memory apparatus, the encrypted data being obtained by encrypting storage data, and the encrypted tag being generated by performing encryption of a probabilistic encryption scheme on an associated keyword associated with the storage data; and a search apparatus to calculate deterministic information when the search apparatus obtains a search keyword for searching for the encrypted data stored in the management memory unit, generate a search query by performing encryption of the probabilistic encryption scheme on the search keyword using the deterministic information, and transmit the search query to the management apparatus, the deterministic information being uniquely determined by the search keyword, wherein when the management apparatus receives the search query from the search apparatus, the management apparatus determines whether the search keyword obtained by decrypting the search query matches the associated keyword obtained by decrypting the encrypted tag stored in the management memory unit.

Advantageous Effects of Invention

According to the secret search system according to the present invention, when the search apparatus obtains a search keyword, the search apparatus calculates deterministic information which is uniquely determined by the search keyword, and generates a search query by performing encryption of a probabilistic encryption scheme on the search keyword, with the deterministic information embedded in the search query. Thus, there is provided an advantageous effect of being able to search for an encrypted tag, using a probabilistic search query having embedded therein deterministic information for speeding up a search process.

DESCRIPTION OF EMBODIMENTS

First Embodiment

\*\*\*Description of Configuration\*\*\*

Figure 1:
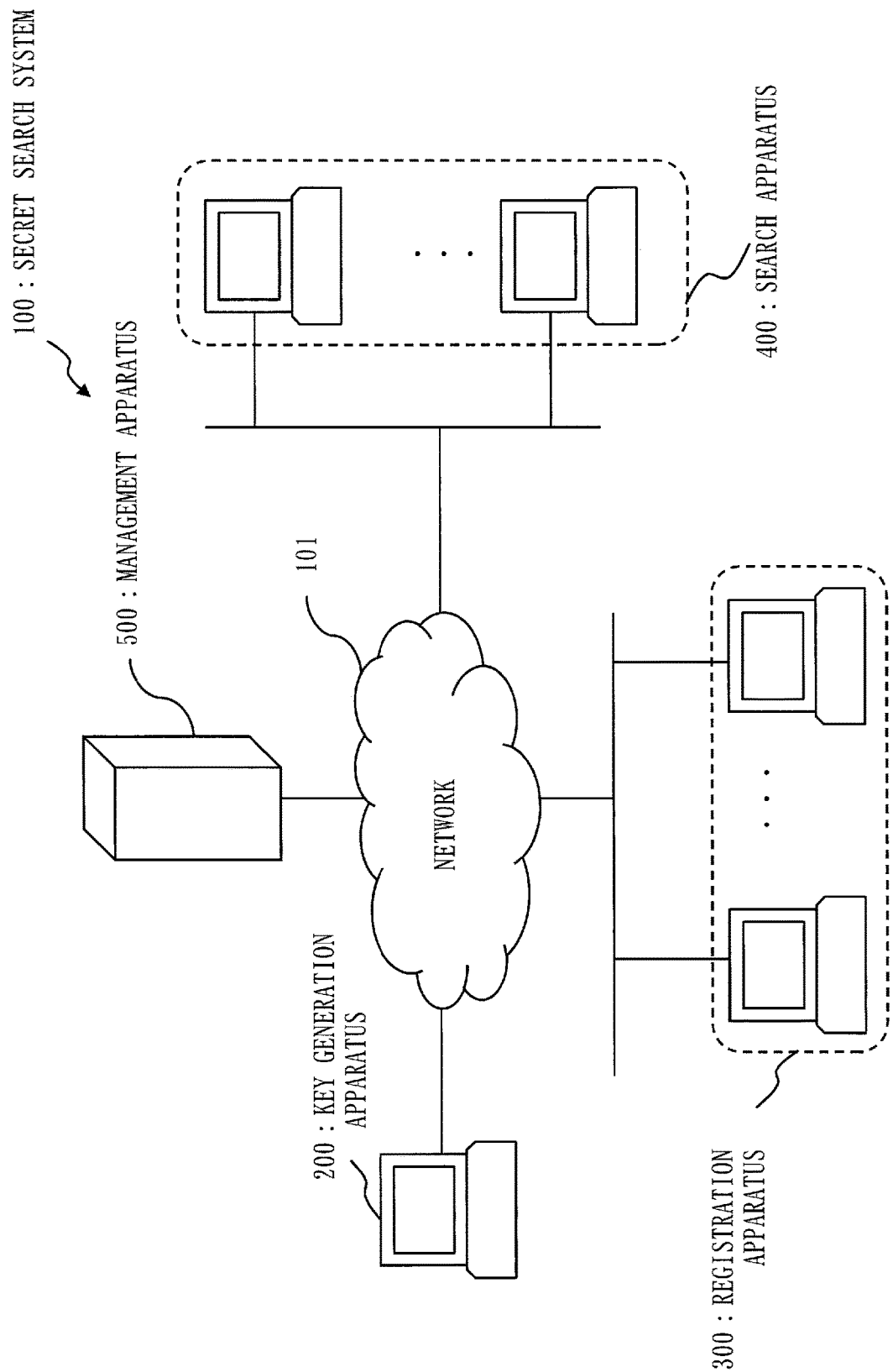
FIG. 1 is a configuration diagram of a secret search system 100 according to a first embodiment.

Using FIG. 1, a configuration of a secret search system 100 according to the present embodiment will be described.

The secret search system 100 includes a key generation apparatus 200, registration apparatuses 300, search apparatuses 400, and a management apparatus 500.

In the secret search system 100, the key generation apparatus 200, the plurality of registration apparatuses 300, the plurality of search apparatuses 400, and the management apparatus 500 are connected to each other via a network 101.

The network 101 is a communication channel that connects the key generation apparatus 200, the plurality of registration apparatuses 300, the plurality of search apparatuses 400, and the management apparatus 500. The network 101 is specifically the Internet or a local area network (LAN), and other types of networks may be used.

The key generation apparatus 200 is specifically a personal computer (PC). The key generation apparatus 200 generates keys which are used for encryption, and transmits the keys to the registration apparatuses 300, the search apparatuses 400, and the management apparatus 500 through the network 101. Note that the keys may be directly transmitted by a method such as mailing.

Each registration apparatus 300 is specifically a PC. The registration apparatus 300 encrypts storage data to be stored in the management apparatus 500 and associated keywords which are associated with the storage data, and thereby generates encrypted data and encrypted tags. Here, the storage data is also referred to as storage file. In addition, the encrypted data is also referred to as encrypted file. The registration apparatus 300 is a computer that operates as a registration terminal that registers the generated encrypted data and encrypted tags in the management apparatus 500.

The registration apparatus 300 also functions as a deletion requesting apparatus. Namely, the registration apparatus 300 requests the management apparatus 500 to delete encrypted data and encrypted tags which are stored in the management apparatus 500. In the following, the encrypted data and the encrypted tags are also referred to as encrypted storage data.

Each search apparatus 400 is specifically a PC. The search apparatus 400 functions as a search requesting apparatus. The search apparatus 400 transmits a search query which is obtained by encrypting a search keyword used for a search, to the management apparatus 500 to request to check the search query against encrypted tags.

The management apparatus 500 is specifically a computing machine having a mass storage medium. The management apparatus 500 functions as a storage apparatus for encrypted storage data. Namely, if there is a request from a registration apparatus 300 to store encrypted data and encrypted tags, the management apparatus 500 stores the encrypted data and the encrypted tags.

The management apparatus 500 also functions as a search apparatus. Namely, if there is a request for a search from a search apparatus 400, the management apparatus 500 checks a set of encrypted tags against a search query, and transmits a search result to the search apparatus 400.

The management apparatus 500 also functions as a deleting apparatus. Namely, if there is a request from a registration apparatus 300 to delete encrypted data and encrypted tags, i.e., encrypted storage data, the management apparatus 500 deletes the encrypted storage data stored therein.

Note that the same PC may include any two or more of the key generation apparatus 200, the registration apparatus 300, and the search apparatus 400 at the same time.

Next, a configuration of each apparatus included in the secret search system 100 will be described.

<Key Generation Apparatus 200>

First, using FIG. 2, a configuration of the key generation apparatus 200 will be described.

In the present embodiment, the key generation apparatus 200 is a computer. The key generation apparatus 200 includes hardware such as a central processing unit (CPU) 910, a memory apparatus 920, an input interface 930, an output interface 940, and a communication apparatus 950. The memory apparatus 920 includes a memory 921 and an auxiliary memory apparatus 922.

The key generation apparatus 200 includes, as a functional configuration, a parameter receiving unit 201, a key generating unit 202, a transmitting unit 209, and a key generation memory unit 250. In the following description, the functions of the parameter receiving unit 201, the key generating unit 202, and the transmitting unit 209 in the key generation apparatus 200 are referred to as the functions of the "units" of the key generation apparatus 200. The functions of the "units" of the key generation apparatus 200 are implemented by software.

In addition, the key generation memory unit 250 is implemented by the memory 921. The key generation memory unit 250 stores data which is used by each unit of the key generation apparatus 200.

The parameter receiving unit 201 receives a parameter λ.

The key generating unit 202 accepts, as input, the parameter 2 which is received from the parameter receiving unit 201, and generates a key K1 and a key K2 for encrypting or decrypting data.

The transmitting unit 209 transmits the key K1 generated by the key generating unit 202 to the registration apparatus 300 and the search apparatus 400. In addition, the transmitting unit 209 transmits the key K2 to the search apparatus 400 and the management apparatus 500.

<Registration Apparatus 300>

Next, using FIG. 3, a configuration of the registration apparatus 300 will be described.

In the present embodiment, the registration apparatus 300 is a computer. The registration apparatus 300 includes hardware such as a CPU 910, a memory apparatus 920, an input interface 930, an output interface 940, and a communication apparatus 950. The memory apparatus 920 includes a memory 921 and an auxiliary memory apparatus 922.

The registration apparatus 300 includes, as a functional configuration, a receiving unit 301, a key storing unit 302, an input unit 311, an encrypting unit 312, a transmitting unit 319, and a registration memory unit 350. In the following description, the functions of the receiving unit 301, the key storing unit 302, the input unit 311, the encrypting unit 312, and the transmitting unit 319 of the registration apparatus 300 are referred to as the functions of the "units" of the registration apparatus 300. The functions of the "units" of the registration apparatus 300 are implemented by software.

In addition, the registration memory unit 350 is implemented by the memory 921. The registration memory unit 350 stores data which is used by each unit of the registration apparatus 300.

The receiving unit 301 receives the key K1 transmitted from the key generation apparatus 200.

The key storing unit 302 stores the key K1 received from the receiving unit 301, in the registration memory unit 350.

The input unit 311 receives, through the input interface 930, storage data D, a storage data name ID(D), and a set W(D) of associated keywords w to be associated with the storage data D, which are inputted by a data registrant. In addition, the input unit 311 receives a deletion request 339 for deleting storage data D.

The encrypting unit 312 receives the key K1 from the key storing unit 302, receives the storage data D, the storage data name ID(D), and the set W(D) of associated keywords w from the input unit 311, and encrypts the storage data D and the set W(D) of associated keywords, using the key K1. The encrypting unit 312 generates a set R(D) of first random numbers r which are used for encryption.

The storage data D having been encrypted using the key K1 is encrypted data E(D). The set W(D) of associated keywords w having been probabilistically encrypted using the key K1 and the set R(D) of first random numbers r is a set C(D) of encrypted tags c.

Namely, the encrypting unit 312 generates a pair (ID(D), C(D)) of the storage data name ID(D) and the set C(D) of encrypted tags c, and the set R(D) of first random numbers r. (ID(D), C(D)) may be hereinafter written as encrypted storage data. Note that it is assumed that the encrypted data E(D) is associated with the storage data name ID(D). That is, it is assumed that the encrypted storage data (ID(D), C(D)) represents a pair of the encrypted data E(D) associated with the storage data name ID(D) and the set C(D) of encrypted tags c.

Note that a set of associated keywords w may be written as associated keywords W(D), a set of first random numbers r as first random numbers R(D), and a set of encrypted tags c as encrypted tags C(D).

The transmitting unit 319 transmits the encrypted storage data (ID(D), C(D)) received from the encrypting unit 312, to the management apparatus 500. In addition, the set R(D) of first random numbers r received from the encrypting unit 312 is transmitted to the search apparatus 400. In addition, the transmitting unit 319 transmits the deletion request 339 received from the input unit 311, to the management apparatus 500.

<Search Apparatus 400>

Next, using FIG. 4, a configuration of the search apparatus 400 will be described.

In the present embodiment, the search apparatus 400 is a computer. The search apparatus 400 includes hardware such as a CPU 910, a memory apparatus 920, an input interface 930, an output interface 940, and a communication apparatus 950. The memory apparatus 920 includes a memory 921 and an auxiliary memory apparatus 922.

The search apparatus 400 includes, as a functional configuration, a receiving unit 401, an input unit 411, an encrypting unit 412, a transmitting unit 419, a key storing unit 421, an auxiliary information storing unit 422, a search result output unit 439, and a search memory unit 450. In the following description, the functions of the receiving unit 401, the input unit 411, the encrypting unit 412, the transmitting unit 419, the key storing unit 421, the auxiliary information storing unit 422, and the search result output unit 439 of the search apparatus 400 are referred to as the functions of the "units" of the search apparatus 400. The functions of the "units" of the search apparatus 400 are implemented by software.

In addition, the search memory unit 450 is implemented by the memory 921. The search memory unit 450 stores data which is used by each unit of the search apparatus 400.

The receiving unit 401 receives the key K1 and the key K2 which are transmitted from the key generation apparatus 200, the set R(D) of first random numbers r transmitted from the registration apparatus 300, or a search result I(s) transmitted from the management apparatus 500.

The key storing unit 421 stores the key K1 and the key K2 which are received from the receiving unit 401, in the search memory unit 450.

The input unit 411 receives a search keyword s and a deterministic instruction f which are inputted by a data searcher. The deterministic instruction f is specifically a flag, and is also referred to as high-speed index generation flag.

The auxiliary information storing unit 422 stores the set R(D) of first random numbers r received from the receiving unit 401, in the search memory unit 450. A set of all first random numbers which are accumulated in the search memory unit 450 by the auxiliary information storing unit 422 is hereinafter written as R. In addition, the auxiliary information storing unit 422 stores search history information 451 in the search memory unit 450. Namely, the auxiliary information storing unit 422 receives the deterministic instruction f and deterministic information t of the search keyword s from the encrypting unit 412, and receives the search result I(s) for the search keyword s from the receiving unit 401. Then, when the auxiliary information storing unit 422 has been able to confirm that the management apparatus 500 has generated high-speed index information 554 which will be described later, the auxiliary information storing unit 422 accumulates the deterministic information tin the search history information 451. If the auxiliary information storing unit 422 cannot confirm the generation of the high-speed index information 554, the auxiliary information storing unit 422 does not perform anything. A set of all pieces of deterministic information t which are accumulated in the search history information 451 in the search memory unit 450 by the auxiliary information storing unit 422 is hereinafter written as T.

The deterministic information t of the search keyword s is an identifier that has a one-to-one correspondence with the search keyword s. Namely, when pieces of deterministic information of given search keywords s and s' are t and t', respectively, the fact that s and s' match is equivalent to the fact that t and t' match. The deterministic information t is specifically computed by a technique such as a hash function. The deterministic information t is also referred to as deterministic value.

The encrypting unit 412 receives the key K1 and the key K2 from the key storing unit 421, the set R of first random numbers and the set T of deterministic information t from the auxiliary information storing unit 422, and the search keyword s and the deterministic instruction f from the input unit 411. The encrypting unit 412 outputs the deterministic information t of the search keyword or a search query Q(s) to the transmitting unit 419.

The transmitting unit 419 transmits the deterministic information t or search query Q(s) received from the encrypting unit 412, to the management apparatus 500 through the communication apparatus 950.

The search result output unit 439 outputs a search result to the data searcher through the output interface 940, based on the search result I(s) received from the receiving unit 401.

<Management Apparatus 500>

Next, using FIG. 5, a configuration of the management apparatus 500 will be described.

In the present embodiment, the management apparatus 500 is a computer. The management apparatus 500 includes hardware such as a CPU 910, a memory apparatus 920, an input interface 930, an output interface 940, and a communication apparatus 950. The memory apparatus 920 includes a memory 921 and an auxiliary memory apparatus 922.

The management apparatus 500 includes, as a functional configuration, a receiving unit 501, a key storing unit 511, a data storing unit 521, a high-speed checking unit 531, a checking unit 502, a transmitting unit 509, and a management memory unit 550. In the following description, the functions of the receiving unit 501, the key storing unit 511, the data storing unit 521, the high-speed checking unit 531, the checking unit 502, and the transmitting unit 509 of the management apparatus 500 are referred to as the functions of the "units" of the management apparatus 500. The functions of the "units" of the management apparatus 500 are implemented by software.

In addition, the management memory unit 550 is implemented by the memory 921. The management memory unit 550 stores data which is used by each unit of the management apparatus 500.

The receiving unit 501 receives the key K2 transmitted from the key generation apparatus 200, the encrypted storage data (ID(D), C(D)) or deletion request 339 transmitted from the registration apparatus 300, and the deterministic information t or search query Q(s) transmitted from the search apparatus 400.

The key storing unit 511 stores the key K2 received from the receiving unit 501, in the management memory unit 550.

The data storing unit 521 stores the encrypted storage data (ID(D), C(D)) received from the receiving unit 501, in the management memory unit 550. The data storing unit 521 may store, if necessary, information such as the date and time of transmission, together with the encrypted storage data (ID(D), C(D)). In addition, the data storing unit 521 deletes encrypted storage data (ID(D), C(D)) stored in the management memory unit 550, based on the deletion request 339 received from the receiving unit 501.

Note that, in the following description, the encrypted storage data (ID(D), C(D)) may be described as encrypted storage data 551, the encrypted data E(D) as encrypted data 552, and the set C(D) of encrypted tags c as encrypted tags 553.

The high-speed checking unit 531 generates, for the deterministic information t and a search result I(s) therefor which are received from the checking unit 502, high-speed index information 554 that allows to retrieve the search result I(s) at high speed with the deterministic information t being a key, and stores the high-speed index information 554 in the management memory unit 550. In addition, the high-speed checking unit 531 extracts, for the deterministic information t received from the receiving unit 501, a corresponding search result I(s) from the management memory unit 550 using the high-speed index information 554, and outputs the search result I(s) to the transmitting unit 509.

The checking unit 502 generates a search result I(s) for the search query Q(s) received from the receiving unit 501, the key K2 received from the key storing unit 511, and all encrypted storage data (ID(D), C(D)) received from the data storing unit 521, and outputs the search result I(s) to the transmitting unit 509. In addition, when the search result I(s) is not an empty set, the checking unit 502 outputs the deterministic information t and the search result I(s) to the high-speed checking unit 531.

The transmitting unit 509 transmits the search result I(s) received from the checking unit 502 or the high-speed checking unit 531, to the search apparatus 400.

Next, the hardware of each of the key generation apparatus 200, the registration apparatus 300, the search apparatus 400, and the management apparatus 500 which are included in the secret search system 100 will be described.

The CPU 910 is connected to other hardware through signal lines, and controls the other hardware. The CPU 910 is an integrated circuit (IC) that performs processing. The CPU 910 is also referred to as processor.

The memory apparatus 920 includes the auxiliary memory apparatus 922 and the memory 921. The auxiliary memory apparatus 922 is specifically a read only memory (ROM), a flash memory, or a hard disk drive (HDD). The memory 921 is specifically a random access memory (RAM). The memory units of the respective apparatuses included in the secret search system 100, i.e., the key generation memory unit 250, the registration memory unit 350, the search memory unit 450, and the management memory unit 550, are implemented by the memory 921, but may be implemented by both the auxiliary memory apparatus 922 and the memory 921.

The input interface 930 is a port connected to an input apparatus such as a mouse, a keyboard, or a touch panel. The input interface 930 is specifically a universal serial bus (USB) terminal. Note that the input interface 930 may be a port connected to a local area network (LAN).

The output interface 940 is a port to which is connected a cable of a display device such as a display. The output interface 940 is specifically a USB terminal or a high definition multimedia interface (HDMI) (registered trademark) terminal. The display is specifically a liquid crystal display (LCD).

The communication apparatus 950 includes a receiver that receives data and a transmitter that transmits data. The communication apparatus 950 is specifically a communication chip or a network interface card (NIC).

The auxiliary memory apparatus 922 stores therein a program that implements the functions of the "units" of each apparatus in the secret search system 100. The program is loaded into the memory, loaded into the CPU 910, and executed by the CPU 910. The auxiliary memory apparatus 922 also stores therein an operating system (OS). At least a part of the OS is loaded into the memory, and the CPU 910 executes the program that implements the functions of the "units" while running the OS.

Each apparatus in the secret search system 100 may include only one CPU 910 or may include a plurality of CPUs 910. The plurality of CPUs 910 may execute the program that implements the functions of the "units" in cooperation with each other.

Information, data, signal values, and variable values that indicate processing results of the "units" are stored in the auxiliary memory apparatus, the memory, or a register or a cache memory in the CPU 910.

The program that implements the functions of the "units" may be stored in a portable recording medium such as a magnetic disk, a flexible disk, an optical disc, a compact disc, a Blu-ray (registered trademark) Disc, or a digital versatile disc (DVD).

Note that a secret search program 620 is a program that implements functions that are described as the "units" of each apparatus in the secret search system 100. Note also that one that is referred to as secret search program product is a storage medium and a memory apparatus in which is recorded the program that implements the functions described as the "units", and has a computer readable program loaded thereinto regardless of visual formats.

*Description of Operation*

Next, a secret search process S100 by a secret search method 610 and the secret search program 620 for the secret search system 100 according to the present embodiment will be described.

The secret search process S100 includes a key generation and storage process S110, a registration process S120, a search process S130, and a deletion process S140.

<Key Generation and Storage Process S110>

Using FIG. 6, the key generation and storage process S110 of the secret search system 100 according to the present embodiment will be described.

Figure 6:
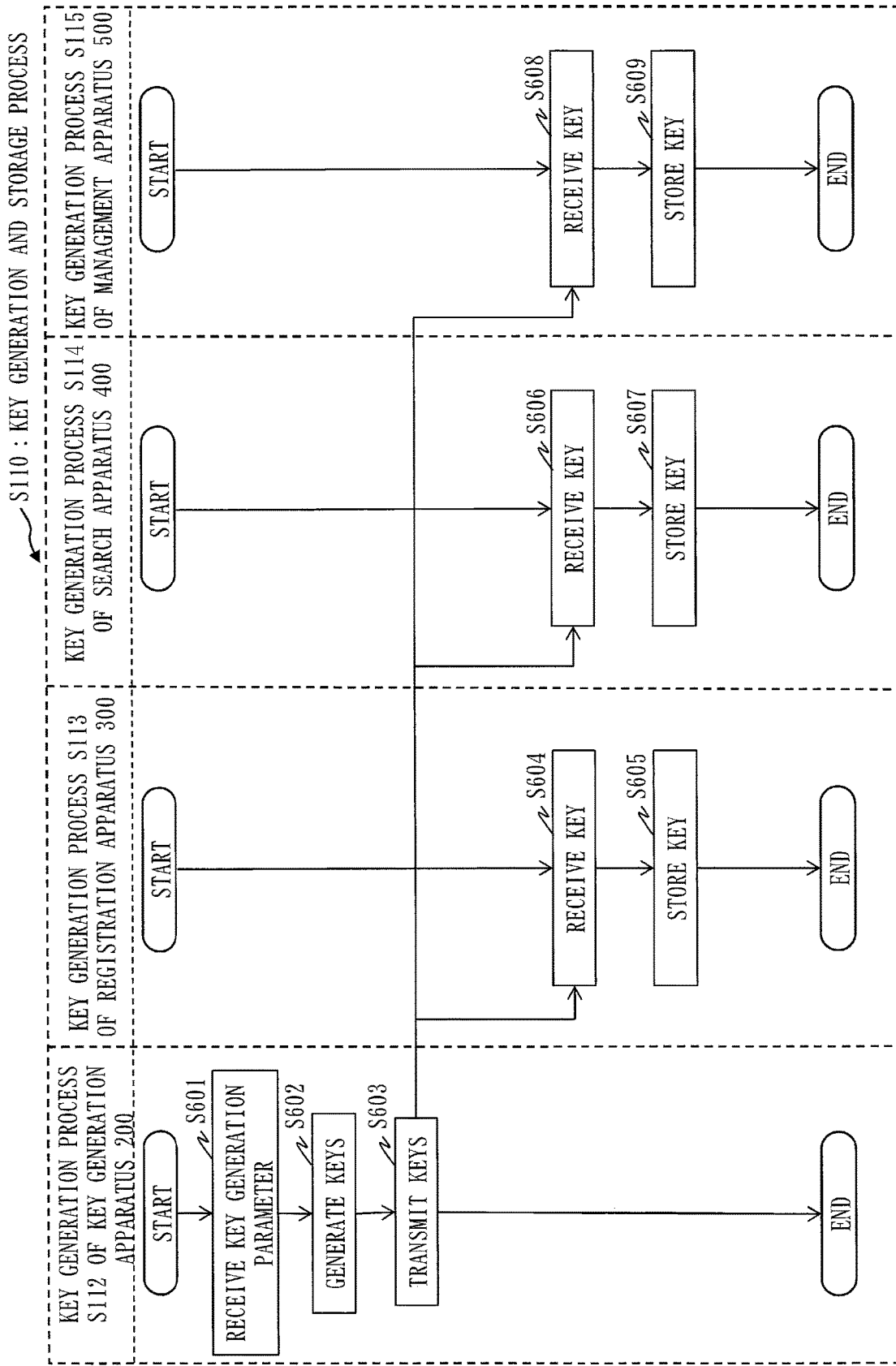
FIG. 6 is a flowchart of a key generation and storage process S110 of the secret search system 100 according to the first embodiment.

Step S601 to S609 of FIG. 6 are processes performed by the key generation apparatus 200, the registration apparatus 300, the search apparatus 400, and the management apparatus 500. Step S601 to S603 are a key generation process S112 which is performed by the key generation apparatus 200. Step S604 to S605 are a key generation process S113 which is performed by the registration apparatus 300. Step S606 to S607 are a key generation process S114 which is performed by the search apparatus 400. Step S608 to S609 are a key generation process S115 which is performed by the management apparatus 500.

At step S601, the parameter receiving unit 201 of the key generation apparatus 200 receives a parameter $\lambda$ through the communication apparatus 950 of the key generation apparatus 200.

At step S602, the key generating unit 202 of the key generation apparatus 200 accepts, as input, the parameter $\lambda$ which is received by the parameter receiving unit 201 of the key generation apparatus 200 at step S601, and generates a key K1 and a key K2.

At step S603, the transmitting unit 209 of the key generation apparatus 200 accepts, as input, the key K1 and the key K2 which are generated by the key generating unit 202 of the key generation apparatus 200 at step S602, and transmits the key K1 to the registration apparatus 300 and the search apparatus 400. In addition, the transmitting unit 209 of the key generation apparatus 200 transmits the key K2 to the search apparatus 400 and the management apparatus 500.

At step S604, the receiving unit 301 of the registration apparatus 300 receives, through the communication apparatus 950 of the registration apparatus 300, the key K1 which is transmitted by the transmitting unit 209 of the key generation apparatus 200 at step S603.

At step S605, the key storing unit 302 of the registration apparatus 300 stores the key K1 which is received by the receiving unit 301 of the registration apparatus 300 at step S604.

At step S606, the receiving unit 401 of the search apparatus 400 receives, through the communication apparatus 950 of the search apparatus 400, the key K1 and the key K2 which are transmitted by the transmitting unit 209 of the key generation apparatus 200 at step S603.

At step S607, the key storing unit 421 of the search apparatus 400 stores the key K1 and the key K2 which are received by the receiving unit 401 of the search apparatus 400 at step S606.

At step S608, the receiving unit 501 of the management apparatus 500 receives, through the communication apparatus 950 of the management apparatus 500, the key K2 which is transmitted by the transmitting unit 209 of the key generation apparatus 200 at step S603.

At step S609, the key storing unit 511 of the management apparatus 500 stores the key K2 which is received by the receiving unit 501 of the management apparatus 500 at step S608.

By this, the key generation and storage process S110 of the secret search system 100 ends.

Note that since the keys K1 and K2 are confidential information, the key storing unit 302 and the key storing unit 421 need to securely store the keys K1 and K2 so that the keys K1 and K2 are not leaked outside.

<Registration Process S120>

Using FIG. 7, the registration process S120 of the secret search system 100 according to the present embodiment will be described.

Figure 7:
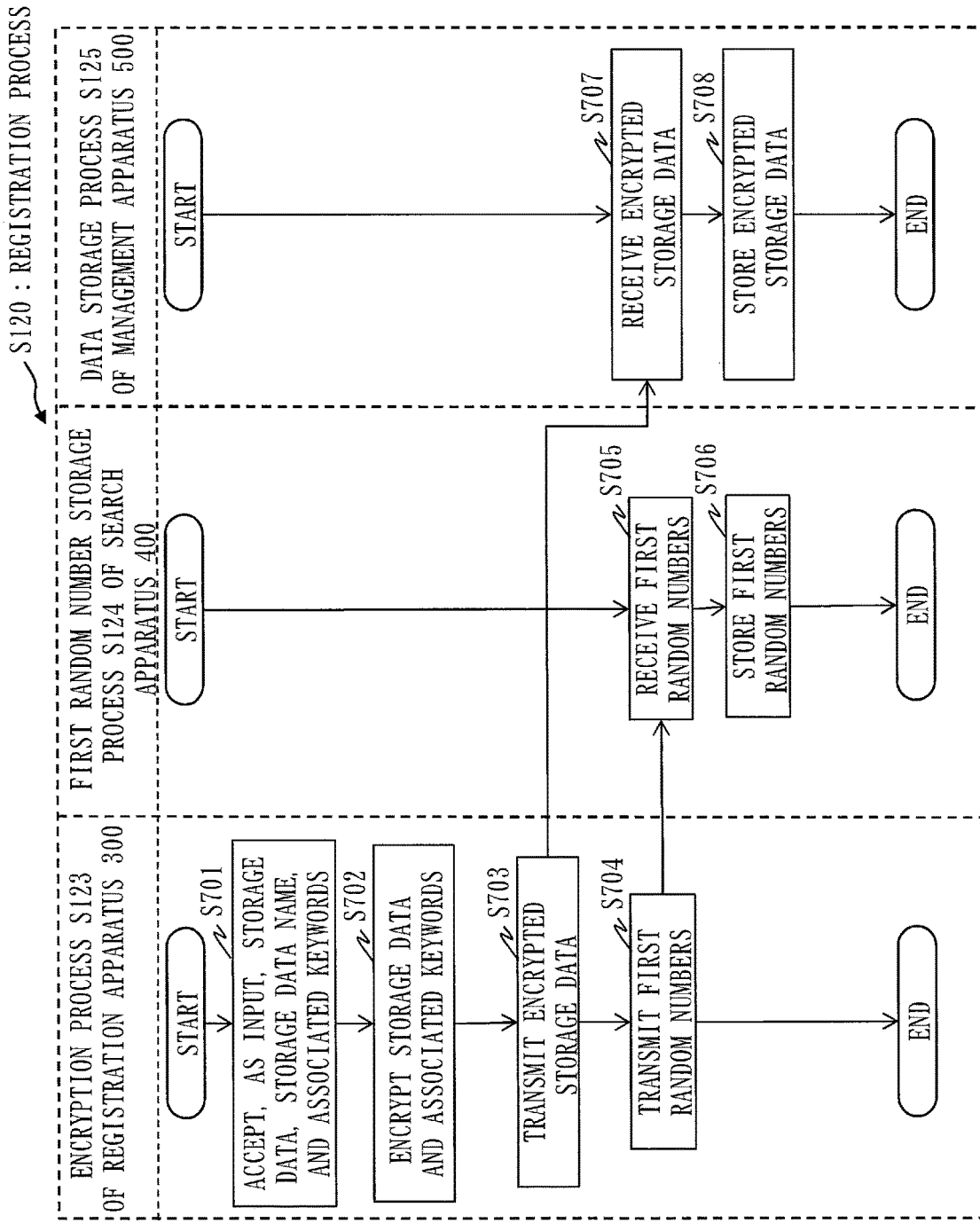
FIG. 7 is a flowchart of a registration process S120 of the secret search system 100 according to the first embodiment.

Step S701 to S708 of FIG. 7 are processes performed by the registration apparatus 300, the search apparatus 400, and the management apparatus 500. Step S701 to S704 are an encryption process S123 which is performed by the registration apparatus 300. Step S705 to S706 are a first random number storage process S124 which is performed by the search apparatus 400. Step S707 to S708 are a data storage process S125 which is performed by the management apparatus 500.

At the encryption process S123 of the registration apparatus 300, the registration apparatus 300 generates first random numbers R(D), and performs encryption of a probabilistic encryption scheme on associated keywords W(D) using the first random numbers R(D), and thereby generates encrypted tags C(D).

In addition, the registration apparatus 300 transmits the encrypted tags C(D) and encrypted data E(D) which is obtained by encrypting storage data D, to the management apparatus 500. In addition, the registration apparatus 300 transmits the first random numbers R(D) to the search apparatus 400.

A specific description will be made below.

At step S701, the input unit 311 of the registration apparatus 300 receives, from a data registrant, storage data D, a storage data name ID(D), and a set W(D) of associated keywords w to be associated with the storage data D, which are inputted from a keyboard, a mouse, or a memory apparatus. If there is no input of a storage data name ID(D) from the data registrant, the input unit 311 may assign a random number to a storage data name ID(D) of the inputted storage data D, or may assign integer values greater than 0 in turn such that the values do not overlap the storage data names of other storage data.

At step S702, the encrypting unit 312 of the registration apparatus 300 receives the key K1 which is stored by the key storing unit 302 at step S605. In addition, the encrypting unit 312 receives the storage data D, the storage data name ID(D), and the set W(D) of associated keywords w, which are inputted to the input unit 311 at step S701. Then, the encrypting unit 312 performs the following process.

The encrypting unit 312 sets one element of the set W(D) of associated keywords w as an associated keyword w. The encrypting unit 312 generates, by a random number generator, first random numbers r for all associated keywords w, and sets c such that $c=E(K1, E(K1, w), r)$. Note that E is an encryption function. Specifically, E is a common key cryptosystem such as advanced encryption standard (AES), a message authentication code such as hash-based message authentication code (HMAC), or a hash function such as secure hash algorithm (SHA)-256. Here, ciphertexts computed for all associated keywords w, i.e., a set of encrypted tags c, are written as C(D). In addition, a set of all first random numbers r generated at this time is written as R(D).

As described above, the encrypting unit 312 generates encrypted storage data (ID(D), C(D)) and a set R(D) of first random numbers r.

At step S703, the transmitting unit 319 of the registration apparatus 300 transmits the encrypted storage data (ID(D), C(D)) which is generated at step S702, to the management apparatus 500.

At step S704, the transmitting unit 319 of the registration apparatus 300 transmits the set R(D) of first random numbers r which are generated at step S702, to the search apparatus 400.

At step S705 of the first random number storage process S124 of the search apparatus 400, the receiving unit 401 of the search apparatus 400 receives, through the communication apparatus 950 of the search apparatus 400, the set R(D) of first random numbers r which is transmitted from the transmitting unit 319 of the registration apparatus 300 at step S704.

At step S706, the auxiliary information storing unit 422 of the search apparatus 400 stores the set R(D) of first random numbers r which is received by the receiving unit 401 at step S705. A set of all first random numbers r which are accumulated in the auxiliary information storing unit 422 are hereinafter written as R.

In the data storage process S125 of the management apparatus 500, the management apparatus 500 receives the encrypted data E(D) obtained by encrypting storage data D, and the encrypted tags C(D) generated by performing encryption of a probabilistic encryption scheme on the associated keywords W(D) which are associated with the storage data D. Then, the management apparatus 500 stores, in the management memory unit 550, the encrypted tags C(D) (encrypted tags 553) and the encrypted data E(D) (encrypted data 552) as encrypted storage data (ID(D), C(D)) (encrypted storage data 551) such that they are associated with each other.

A specific description will be made below.

At step S707, the receiving unit 501 of the management apparatus 500 receives, through the communication apparatus 950 of the management apparatus 500, the encrypted storage data (ID(D), C(D)) which is transmitted from the transmitting unit 319 of the registration apparatus 300 at step S703.

At step S708, the data storing unit 521 of the management apparatus 500 stores, in the management memory unit 550, the encrypted storage data (ID(D), C(D)) which is received by the receiving unit 501 at step S707. As described above, the encrypted storage data (ID(D), C(D)) is a pair of the encrypted data E(D) associated with the storage data name ID(D) and the encrypted tags C(D).

By the above, the registration process S120 of the secret search system 100 ends.

<Search Process S130>

Using FIG. 8, the search process S130 of the secret search system 100 according to the present embodiment will be described.

Figure 8:
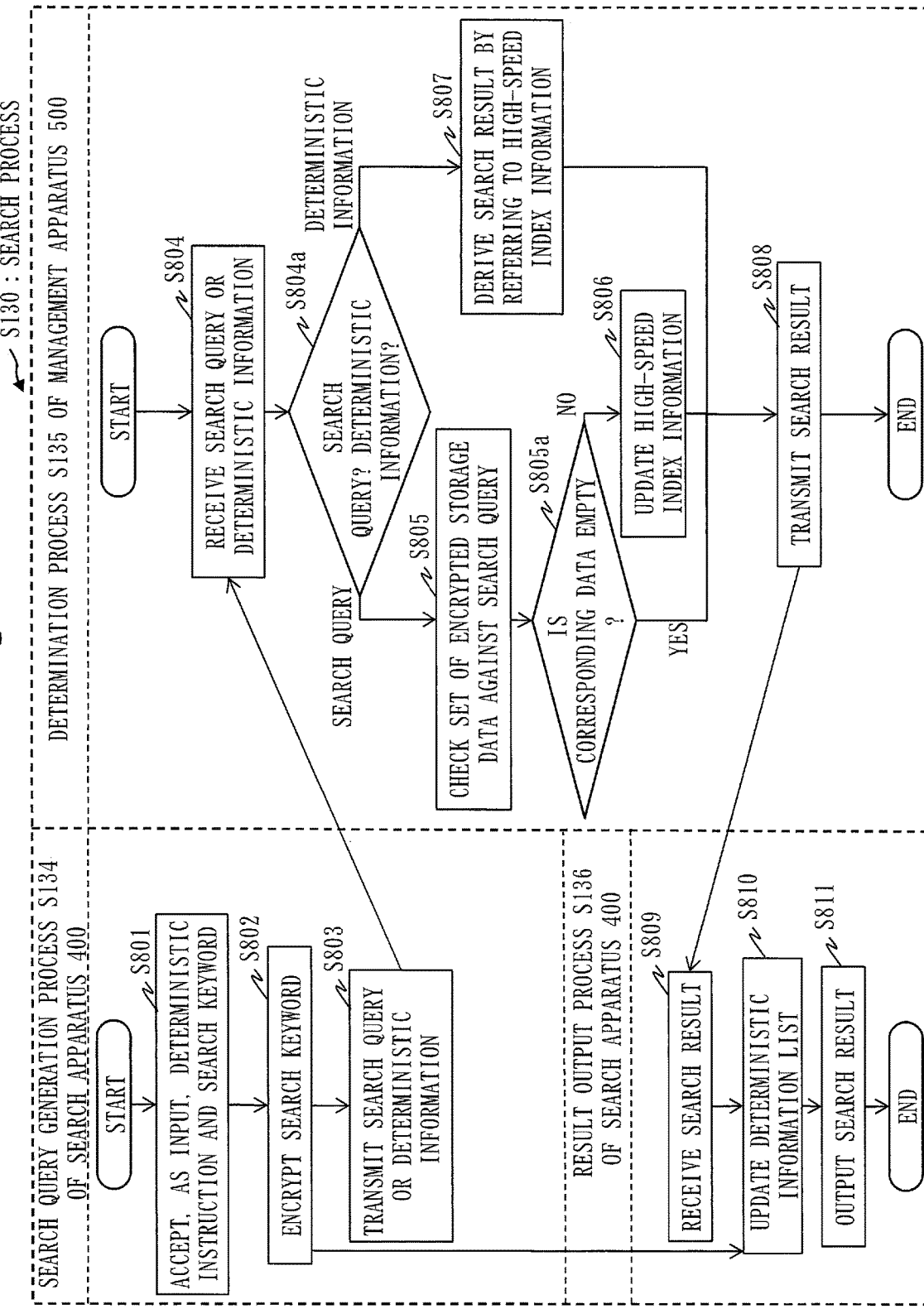
FIG. 8 is a flowchart of a search process S130 of the secret search system 100 according to the first embodiment.

Step S801 to S811 of FIG. 8 are processes performed by the search apparatus 400 and the management apparatus 500. Step S801 to S803 are a search query generation process S134 which is performed by the search apparatus 400. Step S804 to S808 are a determination process S135 which is performed by the management apparatus 500. Step S809 to S811 are a result output process S136 which is performed by the search apparatus 400.

In the search query generation process S134 of the search apparatus 400, the search apparatus 400 obtains a search keyword s for searching for encrypted data E(D) stored in the management memory unit 550. The search apparatus 400 calculates deterministic information t which is uniquely determined by the search keyword s, and performs encryption of a probabilistic encryption scheme on the search keyword s using the deterministic information t, and thereby generates a search query Q(s). Then, the search apparatus 400 transmits the search query Q(s) to the management apparatus 500.

A specific description will be made below.

At step S801, the input unit 411 of the search apparatus 400 receives a search keyword s and a deterministic instruction f which are inputted by a data searcher from a keyboard, a mouse, or a memory apparatus.

Here, the deterministic instruction f is to instruct whether to use deterministic information t upon encrypting the search keyword s, and is specifically a flag. The deterministic instruction f is also referred to as high-speed index generation flag. In addition, the use of deterministic information t upon encrypting the search keyword s indicates the embedding of the deterministic information t which is effective information for a high-speed search, in a search query Q(s).

When the search apparatus 400 obtains a deterministic instruction f and an instruction to use deterministic information t is given by the deterministic instruction f, the search apparatus 400 performs encryption of a probabilistic encryption scheme on the search keyword s using the deterministic information t.

In addition, when an instruction not to use deterministic information t is given by the deterministic instruction f, the search apparatus 400 performs encryption of a probabilistic encryption scheme on the search keyword s without using the deterministic information.

At step S802, the encrypting unit 412 of the search apparatus 400 receives the key K1 and the key K2 which are stored by the key storing unit 421 at step S607, the set R of first random numbers r which is stored by the auxiliary information storing unit 422 at step S706, a set T of deterministic information t which is managed by the auxiliary information storing unit 422, and the search keyword s and the deterministic instruction f which are inputted to the input unit 411 at step S801. The encrypting unit 412 performs the following process using the received data.

Figure 9:
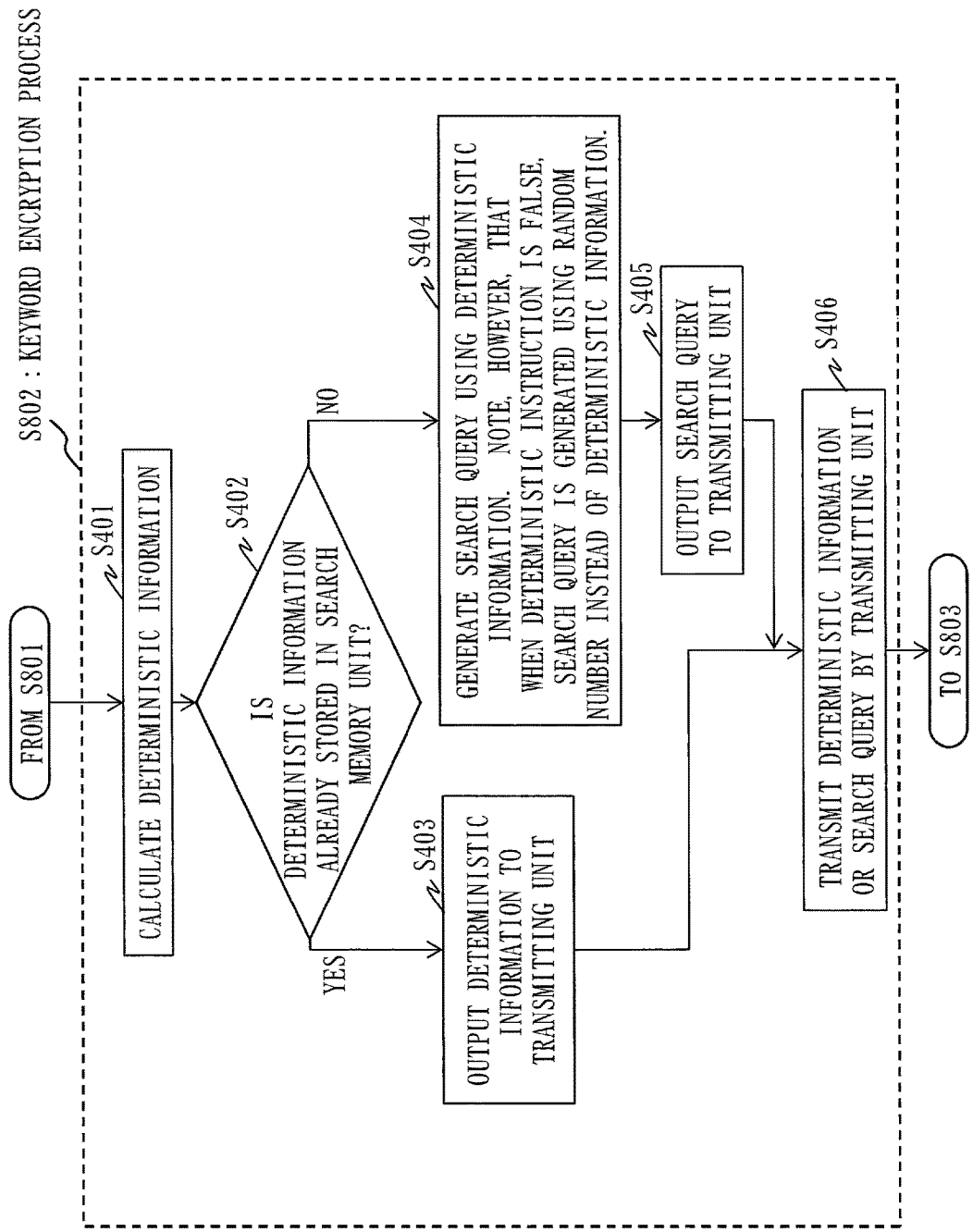
FIG. 9 is a flowchart of a keyword encryption process at step S802 of the search apparatus 400 according to the first embodiment.

FIG. 9 is a flowchart showing a keyword encryption process at step S802 of the search apparatus 400 according to the present embodiment.

At step S401, the search apparatus 400 performs encryption of a deterministic encryption scheme on the search keyword s and thereby calculates deterministic information t. Specifically, the encrypting unit 412 sets the deterministic information t of the search keyword s such that t=E(K1, s).

At step S402, when the encrypting unit 412 has calculated deterministic information t, the encrypting unit 412 determines whether the calculated deterministic information t is accumulated in the search memory unit 450. If the calculated deterministic information t is accumulated in the search memory unit 450 (YES at S402), the encrypting unit 412 transmits the deterministic information t to the management apparatus 500.

Specifically, the encrypting unit 412 checks whether the set T includes the calculated deterministic information t. If the set T includes the calculated deterministic information t, the encrypting unit 412 outputs the calculated deterministic information t to the transmitting unit 419 (step S403).

At step S404, if the deterministic information t is not accumulated in the search memory unit 450 (NO at S402), i.e., if the set T does not include the calculated deterministic information t, the encrypting unit 412 transmits a search query Q(s) to the management apparatus 500.

The encrypting unit 412 generates the search query Q(s) as follows. The encrypting unit 412 generates second random numbers, and performs encryption of a probabilistic encryption scheme on the search keyword s using the second random numbers, the first random numbers R received from the registration apparatus 300, and the deterministic information t. Specifically, the encrypting unit 412 sets a ciphertext di such that di=E(K1, t, ri), for all elements ri (0<=i<|R|) of the set R of first random numbers. Then, for each ciphertext di, a ciphertext ki is set such that ki=E(K2, di). Furthermore, a second random number ui is generated by a random number generator, and a ciphertext qi is set such that qi=(E(ki,t∥ui). At this time, when the deterministic instruction f is false, a meaningless random number is used instead of t. Here, the ∥ operation represents the concatenation of a bit string. A set of the generated ciphertexts qi is written as Q(s). The set Q(s) of ciphertexts q is called a search query. Finally, the search query Q(s) is outputted to the transmitting unit 419 (step S405). In addition, the deterministic instruction f and the deterministic information t are outputted to the auxiliary information storing unit 422.

Here, it is also possible that instead of including the second random number ui in the ciphertext qi, qi is set such that qi=E(ki, $0^\lambda$∥t∥ui). Upon a matching determination between the search query Q(s) and encrypted tags C(D), if, as a result of decrypting the ciphertext qi, $0^\lambda$ appears in a plaintext, then it can be determined that they match, otherwise it can be determined that they do not match.

At step S406, the transmitting unit 419 transmits the deterministic information t or the search query Q(s) to the management apparatus 500.

By the above, the process at step S802 ends, and processing proceeds to step S803 of FIG. 8.

At step S803, the transmitting unit 419 of the search apparatus 400 transmits the deterministic information t or the search query Q(s) which is generated by the encrypting unit 412 at step S802, to the management apparatus 500.

By the above, the processes in the search query generation process S134 of the search apparatus 400 end, and processing proceeds to step S804.

In the determination process S135 of the management apparatus 500, when the management apparatus 500 receives the search query Q(s) from the search apparatus 400, the management apparatus 500 determines whether a search keyword s which is obtained by decrypting the search query Q(s) matches associated keywords w which are obtained by decrypting encrypted tags C(D) stored in the management memory unit 550. If the search keyword s obtained by decrypting the search query Q(s) matches associated keywords w obtained by decrypting encrypted tags C(D), the management apparatus 500 transmits a search result I(s) including encrypted data E(D) associated with the encrypted tags C(D) to the search apparatus 400, and stores, in the management memory unit 550, deterministic information t which is obtained by decrypting the search query Q(s) and the encrypted data E(D) associated with the encrypted tags C(D) such that they are associated with each other.

When the management apparatus 500 receives the deterministic information t from the search apparatus 400, the management apparatus 500 obtains encrypted data E(D) associated with the deterministic information t from the management memory unit 550, and transmits a search result I(s) including the obtained encrypted data E(D) to the search apparatus 400.

A specific description will be made below.

At step S804, the receiving unit 501 of the management apparatus 500 receives the deterministic information t or the search query Q(s) which is transmitted from the transmitting unit 419 of the search apparatus 400 at step S803.

At step S804a, if the receiving unit 501 has received the search query Q(s), processing proceeds to step S805, and if the receiving unit 501 has received the deterministic information t, processing proceeds to step S807.

At step S805, if the information received by the receiving unit 501 at step S804 is the search query Q(s), the checking unit 502 of the management apparatus 500 performs the following process on the key K2 which is stored by the key storing unit 511 at step S609, and all encrypted storage data (ID(D), C(D)) which is stored by the data storing unit 521 at step S708.

The checking unit 502 prepares an empty search result I(s). The checking unit 502 performs the following process on all encrypted storage data (ID(D), C(D)) and the search query Q(s). A matching determination is performed on an arbitrary pair (c, q) of all elements c of the encrypted tags C(D) and all elements q of the search query Q(s) as follows. It is given that two "q" elements are e1 and e2. A ciphertext k is set such that k=E(K2, c). Using Dec which is a decryption function, m is set such that m=Dec(k, e1). m is divided into m1 and m2. When m2 matches e2, it is determined that c and q match. This namely indicates that an element that matches an element of the search query Q(s) is included in the encrypted tags C(D). At this time, m1 is the deterministic information t. When c and q match, a storage data name ID(D) is added to the search result I(s). Here, the addition of a storage data name ID(D) to the search result I(s) indicates the inclusion of encrypted data E(D) associated with the storage data name ID(D) in the search result l(s).

The above-described process is a process of determining whether a search keyword s obtained by decrypting the search query Q(s) matches associated keywords w obtained by decrypting encrypted tags C(D) which are stored in the management memory unit 550.

If the search result I(s) is an empty set, i.e., YES at step S805a, the checking unit 502 outputs the search result I(s) to the transmitting unit 509. If the search result I(s) is not an empty set, i.e., NO at step S805a, the checking unit 502 outputs m1 which is the deterministic information t and the search result I(s) to the high-speed checking unit 531.

At step S806, the high-speed checking unit 531 of the management apparatus 500 stores, in the management memory unit 550, the deterministic information t which is obtained by decrypting the search query Q(s) and the encrypted data E(D) associated with the encrypted tags C(D) such that they are associated with each other. Specifically, the high-speed checking unit 531 accepts, as input, the deterministic information t and the search result I(s) which are received from the checking unit 502 at step S805. Then, the high-speed checking unit 531 stores, in the management memory unit 550, high-speed index information 554 that allows to retrieve the search result I(s) at high speed with the deterministic information t being a key. The high-speed index information 554 is specifically implemented by using a hash table.

At step S807, if the information received by the receiving unit 501 at step S804 is the deterministic information t, the high-speed checking unit 531 of the management apparatus 500 receives the deterministic information t from the receiving unit 501. The high-speed checking unit 531 extracts, for the received deterministic information t, a corresponding search result I(s) from the high-speed index information 554, and outputs I(s) to the transmitting unit 509. If there is no corresponding search result I(s) for the received deterministic information t, the high-speed checking unit 531 outputs an empty set as I(s) to the transmitting unit 509.

At step S808, the transmitting unit 509 of the management apparatus 500 transmits the search result I(s) received from the checking unit 502 or the high-speed checking unit 531, to the search apparatus 400.

By the above, the processes in the determination process S135 of the management apparatus 500 end, and processing proceeds to step S809.

In the result output process S136 of the search apparatus 400, when the search apparatus 400 receives the search result I(s) from the management apparatus 500, the search apparatus 400 accumulates the deterministic information t in the search memory unit 450.

A specific description will be made below.

At step S809, the receiving unit 401 of the search apparatus 400 receives the search result I(s) which is transmitted by the transmitting unit 509 of the management apparatus 500 at step S808.

At step S810, the auxiliary information storing unit 422 of the search apparatus 400 receives the deterministic information t of the search keyword s which is generated by the encrypting unit 412 at step S802 and the deterministic instruction f. Then, the auxiliary information storing unit 422 receives the search result I(s) for the search keyword s which is received by the receiving unit 401 at step S809, and performs the following process.

When the deterministic instruction f is true and the search result I(s) is not an empty set, i.e., when there is encrypted data E(D) for the search query Q(s) having embedded therein the deterministic information t, the auxiliary information storing unit 422 stores the deterministic information t in the search memory unit 450. In addition, when the search result I(s) is an empty set, i.e., there is no encrypted data E(D) for the search query Q(s), and the deterministic information t is already stored in the search memory unit 450 by the auxiliary information storing unit 422, the auxiliary information storing unit 422 deletes the stored deterministic information t.

At step S811, the search result output unit 439 of the search apparatus 400 outputs a search result to the display through the output interface 940, based on the search result I(s) received from the receiving unit 401. When the search result I(s) includes the encrypted data E(D), the search result output unit 439 outputs the storage data name ID(D) of the encrypted data E(D) to the display. In addition, when the search result I(s) is an empty set, the search result output unit 439 outputs information indicating that a search by the search keyword s has failed to the display.

By step S811, the search process of the secret search system 100 ends.

<Deletion Process S140>

Using FIG. 10, the deletion process S140 of the secret search system 100 according to the present embodiment will be described.

Figure 10:
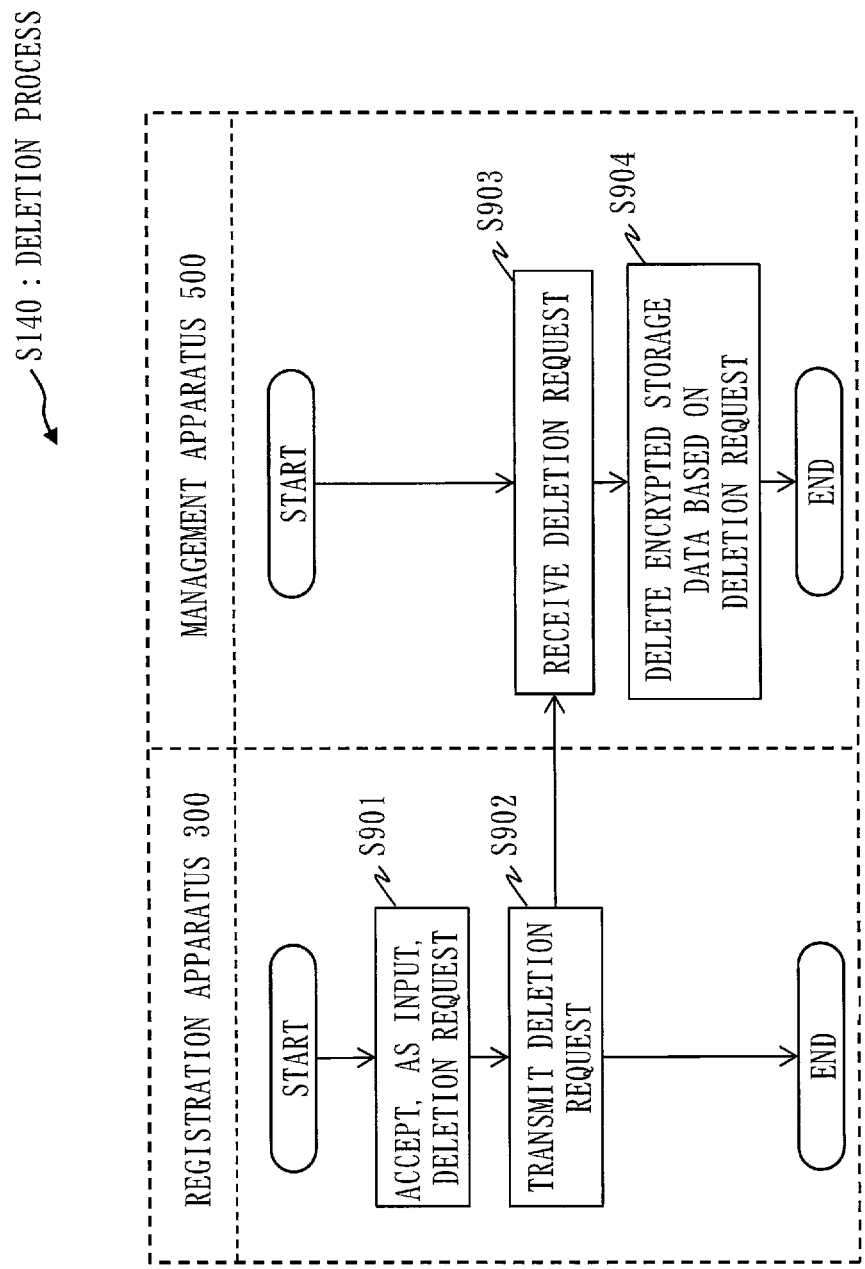
FIG. 10 is a flowchart of a deletion process S140 of the secret search system 100 according to the first embodiment.

Step S901 to S904 of FIG. 10 are processes performed by the registration apparatus 300 and the management apparatus 500. Step S901 to S902 are performed by the registration apparatus 300. Step S903 to S904 are performed by the management apparatus 500.

In the deletion process S140, the management apparatus 500 receives a deletion request 339 for deleting encrypted data 552 which is stored in the management memory unit 550, and deletes encrypted storage data 551 including the encrypted data 552 from the management memory unit 550 based on the deletion request 339.

A specific description will be made below.

At step S901, the input unit 311 of the registration apparatus 300 receives, from a data registrant, a deletion request 339 including a deletion data name, for encrypted storage data that the data registrant wants to delete. Note that the deletion request 339 may be the deletion data name itself. In addition, the deletion request 339 may be any as long as it can identify encrypted storage data corresponding to encrypted data 552.

At step S902, the transmitting unit 319 of the registration apparatus 300 transmits the deletion request 339 which is inputted to the input unit 311 at step S901, to the management apparatus 500.

At step S903, the receiving unit 501 of the management apparatus 500 receives the deletion request 339 which is transmitted from the transmitting unit 319 of the registration apparatus 300 at step S902.

At step S904, the data storing unit 521 and the high-speed checking unit 531 of the management apparatus 500 delete stored encrypted storage data 551, based on the deletion data name included in the deletion request which is received by the receiving unit 501 at step S903.

By step S904, the deletion process S140 of the secret search system 100 ends.

*Other Configurations*

Although, in the present embodiment, the functions of each apparatus in the secret search system 100 are implemented by software, as a variant, the functions of each apparatus in the secret search system 100 may be implemented by hardware.

The variant of the present embodiment will be described using FIGS. 11 to 14.

Figure 11:
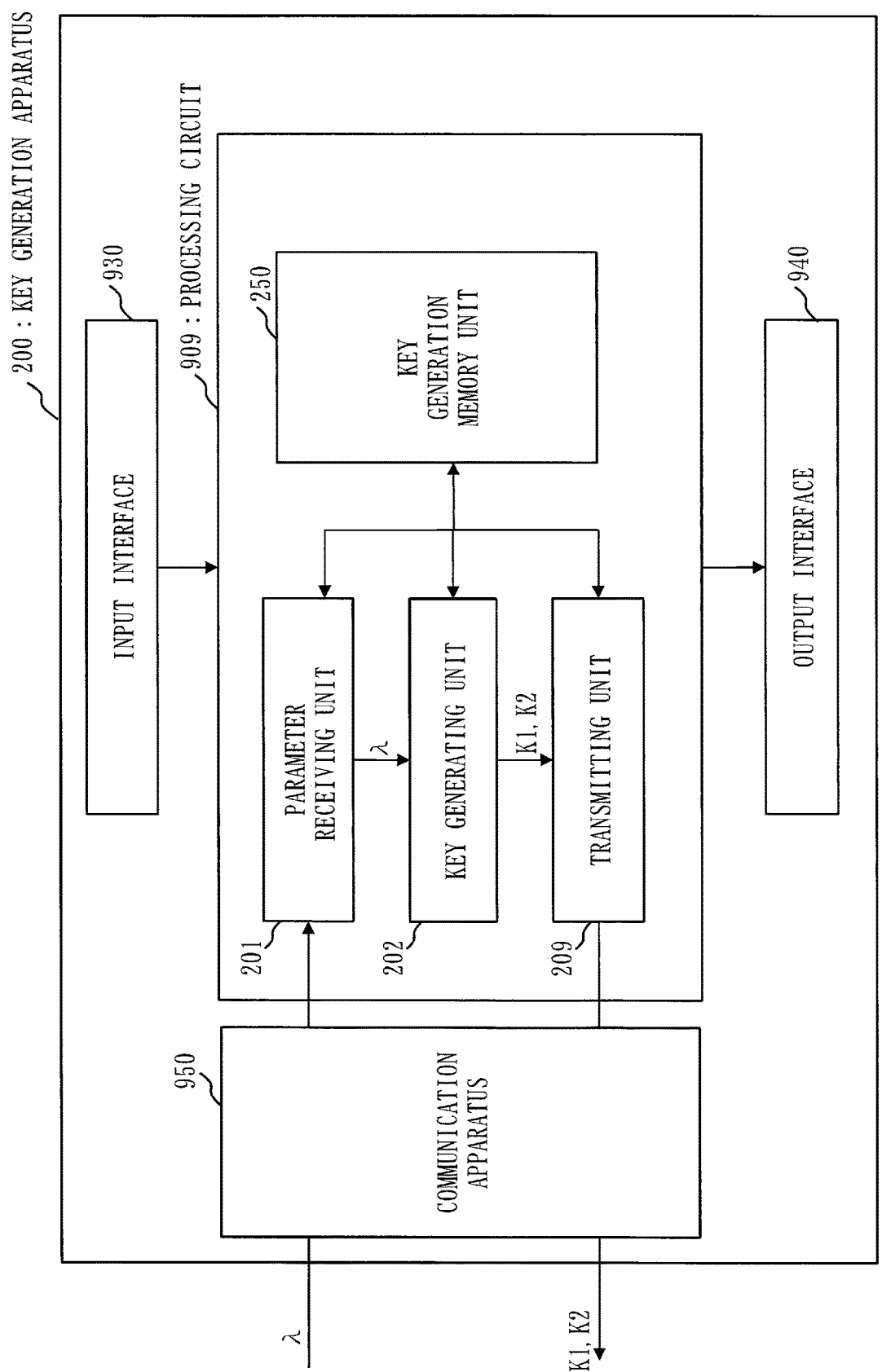
FIG. 11 is a configuration diagram of a variant of a key generation apparatus 200 according to the first embodiment.

FIG. 11 is a diagram showing a configuration of a key generation apparatus 200 according to the variant of the present embodiment.

Figure 12:
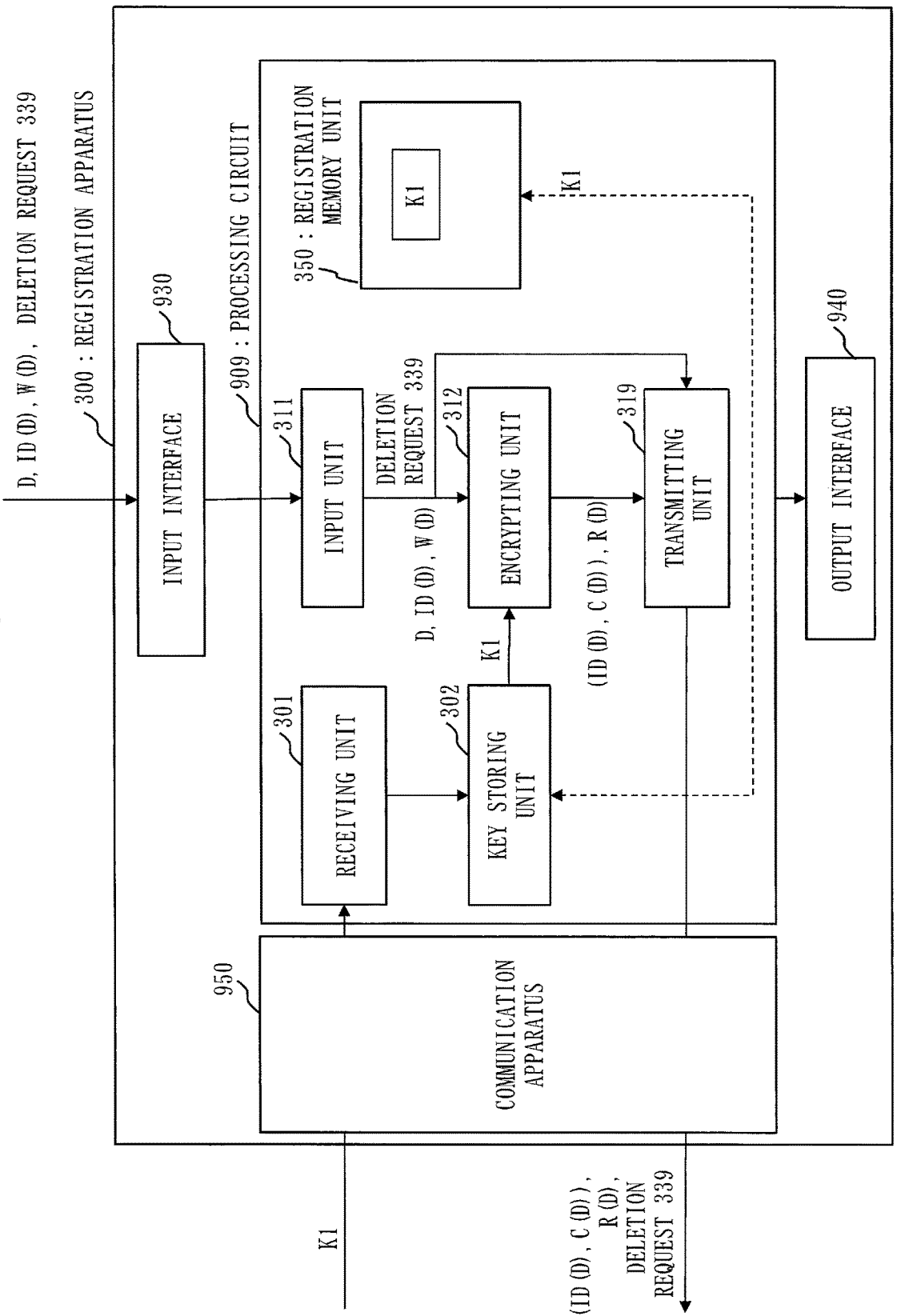
FIG. 12 is a configuration diagram of a variant of a registration apparatus 300 according to the first embodiment.

FIG. 12 is a diagram showing a configuration of a registration apparatus 300 according to the variant of the present embodiment.

Figure 13:
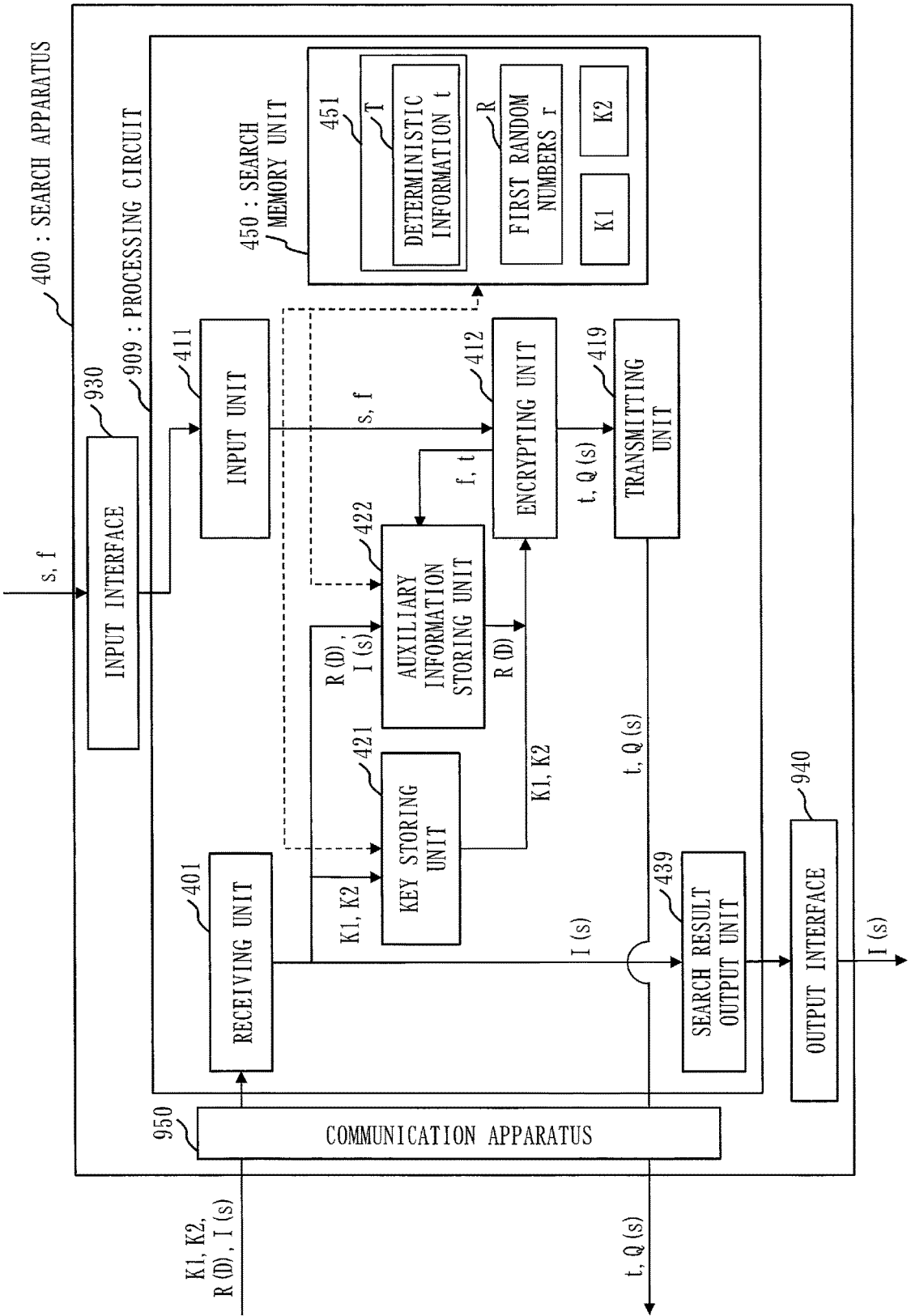
FIG. 13 is a configuration diagram of a variant of a search apparatus 400 according to the first embodiment.

FIG. 13 is a diagram showing a configuration of a search apparatus 400 according to the variant of the present embodiment.

Figure 14:
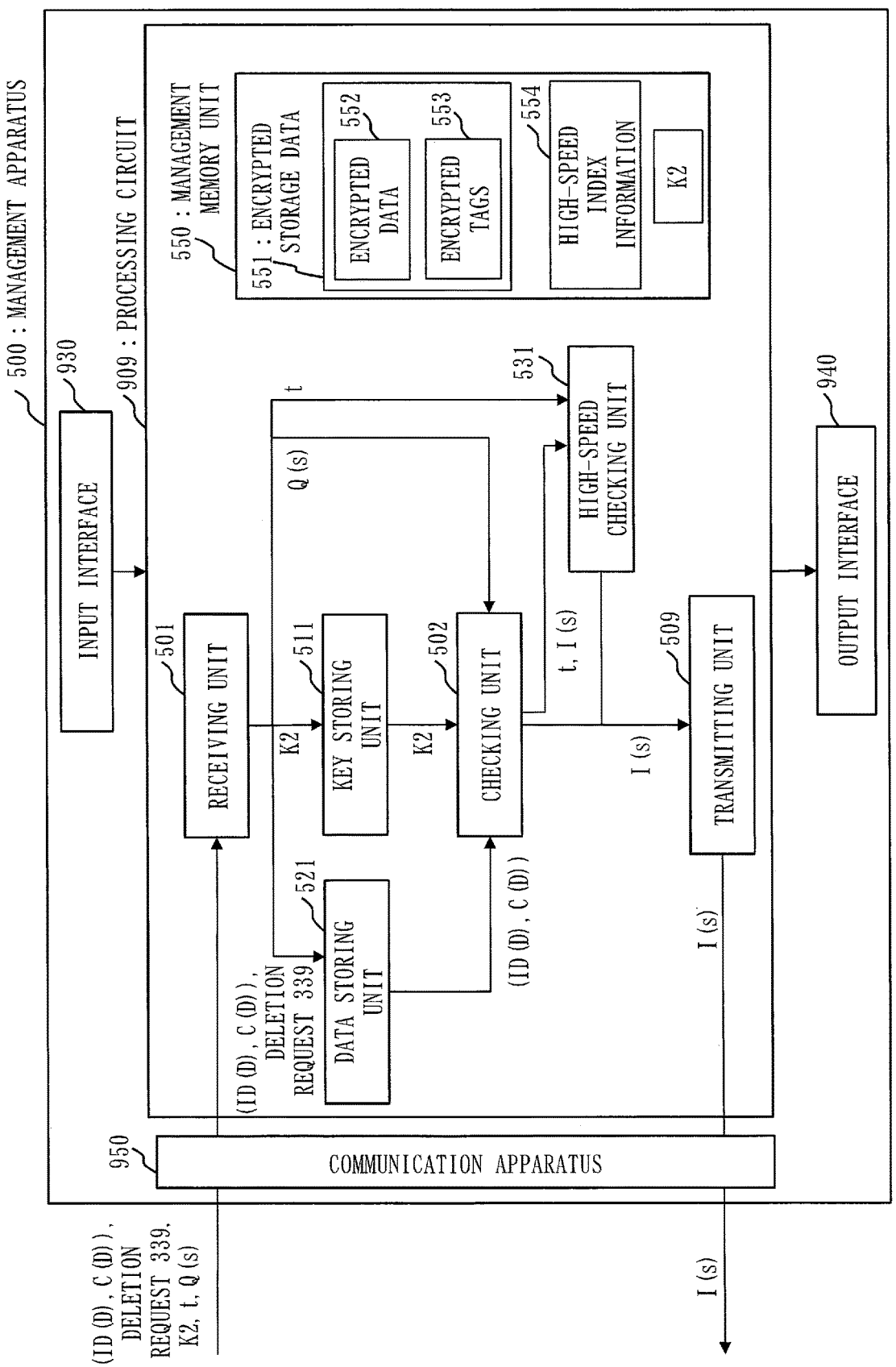
FIG. 14 is a configuration diagram of a variant of a management apparatus 500 according to the first embodiment.

FIG. 14 is a diagram showing a configuration of a management apparatus 500 according to the variant of the present embodiment.

As shown in FIGS. 11 to 14, each apparatus in the secret search system 100 includes a processing circuit 909 instead of the CPU 910 and the memory apparatus 920.

The processing circuit 909 is a dedicated electronic circuit that implements the functions of the "units" of each of the above-described apparatuses and the memory unit of each apparatus. The processing circuit 909 is specifically a single circuit, a multiple circuit, a programmed processor, a parallel programmed processor, a logic IC, a gate array (GA), an application specific integrated circuit (ASIC), or a field-programmable gate array (FPGA).

The functions of the "units" of each apparatus in the secret search system 100 may be implemented by a single processing circuit 909 or may be implemented by a plurality of processing circuits 909 in a distributed manner.

As another variant, the functions of the "units" of each apparatus and the memory unit of each apparatus in the secret search system 100 may be implemented by a combination of software and hardware. Namely, some functions of each apparatus may be implemented by dedicated hardware, and other functions may be implemented by software.

The CPU 910, the memory apparatus 920, and the processing circuit 909 are collectively referred to as "processing circuitry". That is, regardless of which configurations shown in FIGS. 2 to 5 and FIGS. 11 to 14 are used by each apparatus in the secret search system 100, the functions of the "units" are implemented by the processing circuitry.

The "units" may be read as "steps", "procedures", or "processes". In addition, the functions of the "units" may be implemented by firmware.

*Description of Advantageous Effects of the Present Embodiment*

A secret search system according to the present embodiment includes an encrypting unit of a search apparatus that generates a search query having embedded therein information useful for performing a high-speed search; a receiving unit of a management apparatus that receives the search query; a data storing unit of the management apparatus that stores encrypted tags obtained by encrypting associated keywords; and a checking unit of the management apparatus that extracts an encrypted tag that matches an encrypted search keyword from among a set of the stored encrypted tags. Thus, an encrypted tag can be searched for, using a probabilistic search query having embedded therein deterministic information for speeding up a search process. In addition, in the secret search system according to the present embodiment, encrypted tags and search queries are generated by probabilistic encryption. Thus, the encrypted tags and the search queries do not depend on associated keywords which are associated with storage data and the deterministic information of search keywords. By this, the resistance to frequency analysis of the encrypted tags and the search queries increases and thus the encrypted tags and the search queries have a high level of security.

Furthermore, the secret search system according to the present embodiment includes a high-speed checking unit capable of retrieving a search result at high speed for a search query for a search keyword that has been searched for once in the past. Thus, only when encrypted storage data which is a search result is present for a search query, deterministic information for the search query is extracted, and upon the next and subsequent re-searches, a search result can be retrieved at high speed based on the deterministic information. The reason that a search can be speeded up with security remaining at a high level is because the extraction of deterministic information is performed only when encrypted storage data which is a search result is present.

Furthermore, the secret search system according to the present embodiment can allow a data searcher to select whether to embed information for speeding up a search, i.e., deterministic information, in a search query upon generation of the search query, by a deterministic instruction. Thus, according to the secret search system according to the present embodiment, it is also possible for the data searcher to select in advance non-embedding of deterministic information in a search query, and thus, the secret search system is excellent in functionality.

Second Embodiment

In the present embodiment, differences from the first embodiment will be mainly described.

In the present embodiment, portions common to those in the first embodiment are denoted by the same reference signs and description thereof may be omitted.

A secret search system 100a according to the present embodiment performs a secret search using a counter value instead of first random numbers r of the first embodiment. In the present embodiment, in an encryption process S123a of a registration apparatus 300a, a set R(D) of first random numbers r is not generated. In addition, in a search query generation process S134a of a search apparatus 400a, a search query is generated without using a set R(D) of first random numbers r.

Figure 15:
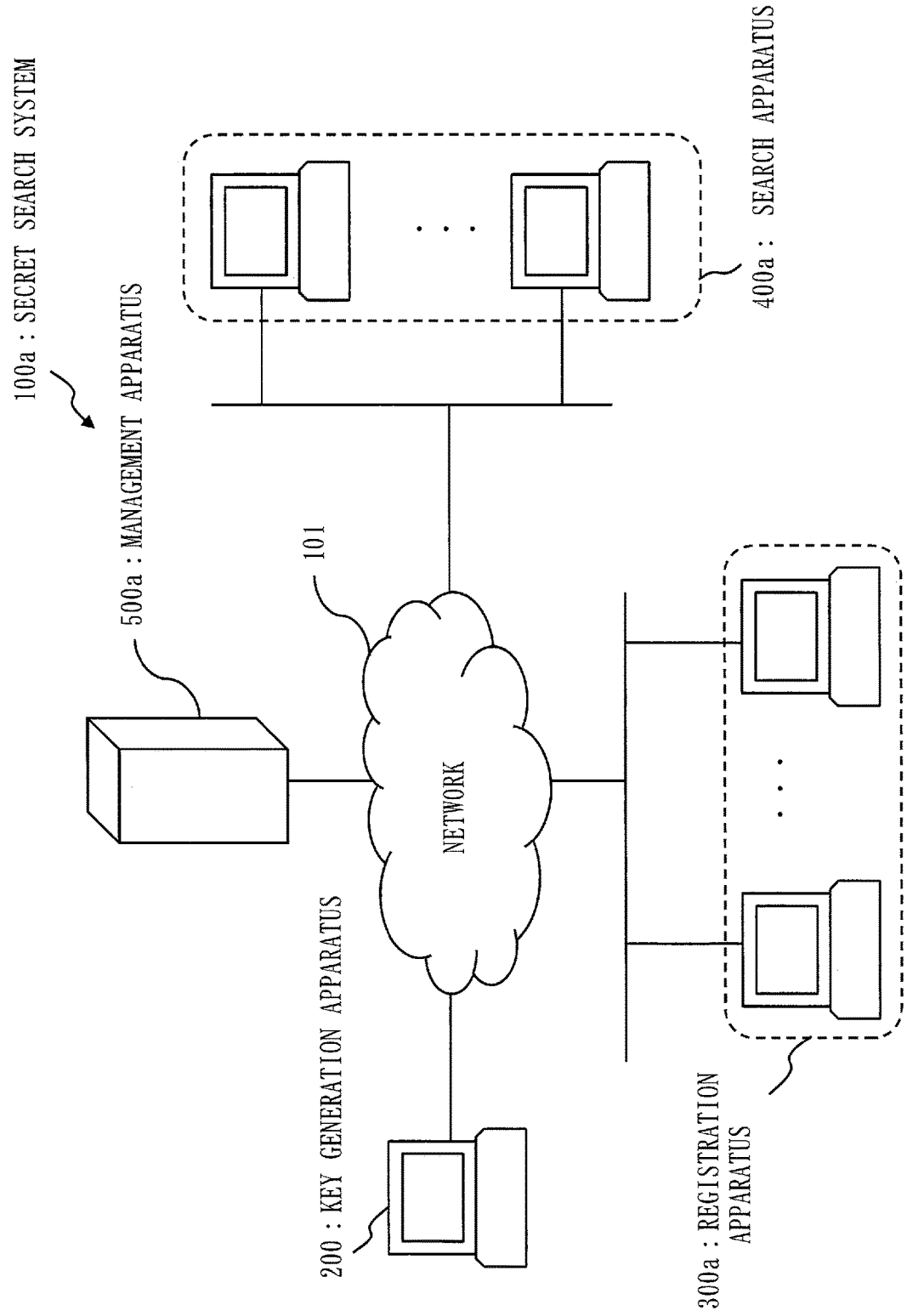
FIG. 15 is a configuration diagram of a secret search system 100a according to a second embodiment.

Using FIG. 15, a configuration of the secret search system 100a according to the present embodiment will be described.

The secret search system 100a includes a key generation apparatus 200, registration apparatuses 300a, search apparatuses 400a, and a management apparatus 500a. FIG. 15 corresponds to FIG. 1 described in the first embodiment. The basic configuration and functions of the secret search system 100a are the same as those of FIG. 1 described in the first embodiment, and thus, description thereof is omitted.

Next, the configuration and functions of each apparatus included in the secret search system 100a according to the present embodiment will be described.

<Key Generation Apparatus 200>

Figure 2:
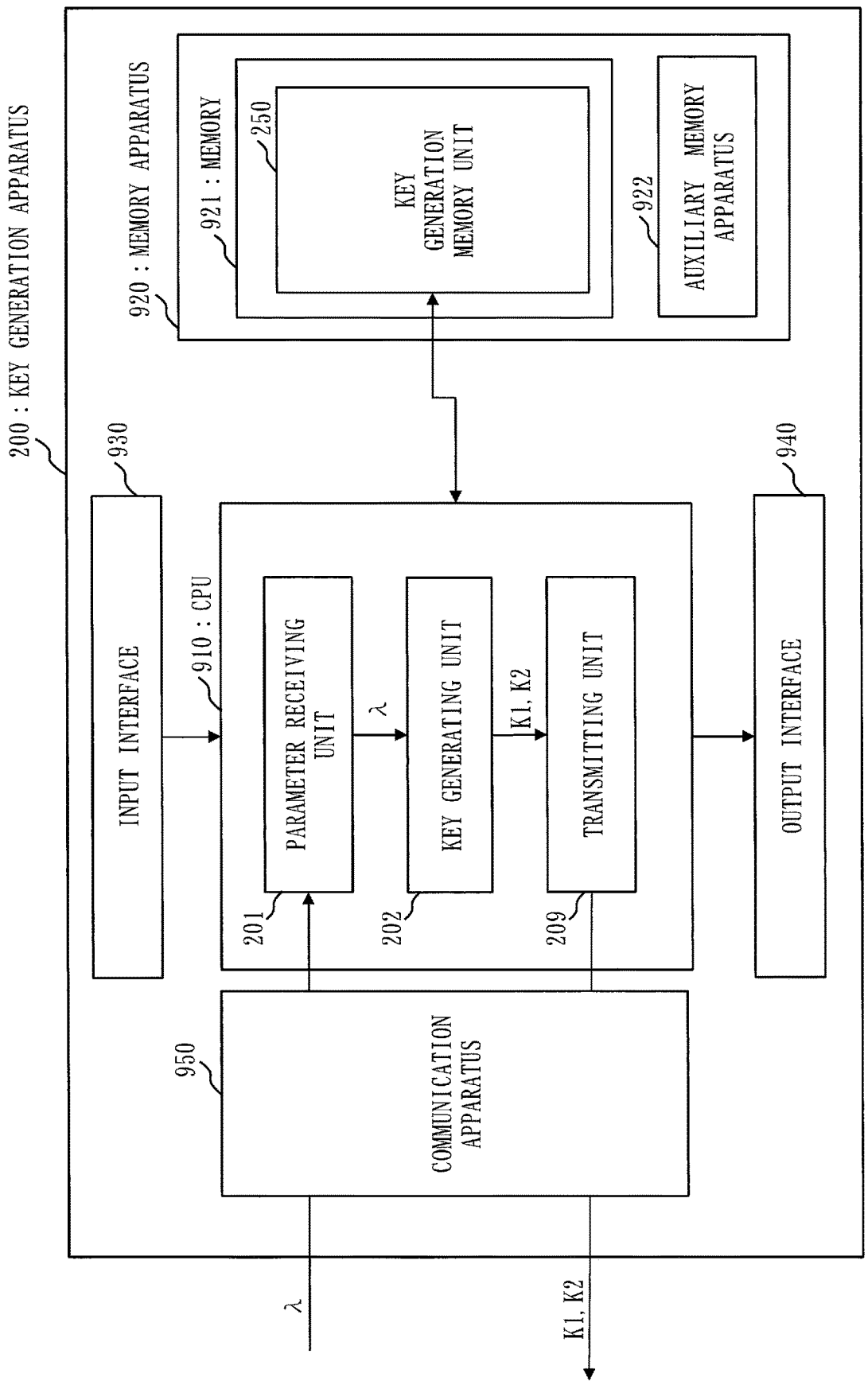
FIG. 2 is a configuration diagram of a key generation apparatus 200 according to the first embodiment.

The configuration and functions of the key generation apparatus 200 according to the present embodiment are the same as those of FIG. 2 described in the first embodiment, and thus, description thereof is omitted.

Note that as described in the first embodiment, the transmitting unit 209 transmits a key K1 generated by the key generating unit 202 to the registration apparatus 300a and the search apparatus 400a, and transmits a key K2 to the search apparatus 400a and the management apparatus 500a. At this time, the key K2 may be a publicly known parameter, or the key K2 may be the same as the key K1. In addition, encryption using the key K2 may be replaced by encryption with no key, or encryption using the key K2 may not be performed.

<Registration Apparatus 300a>

Figure 16:
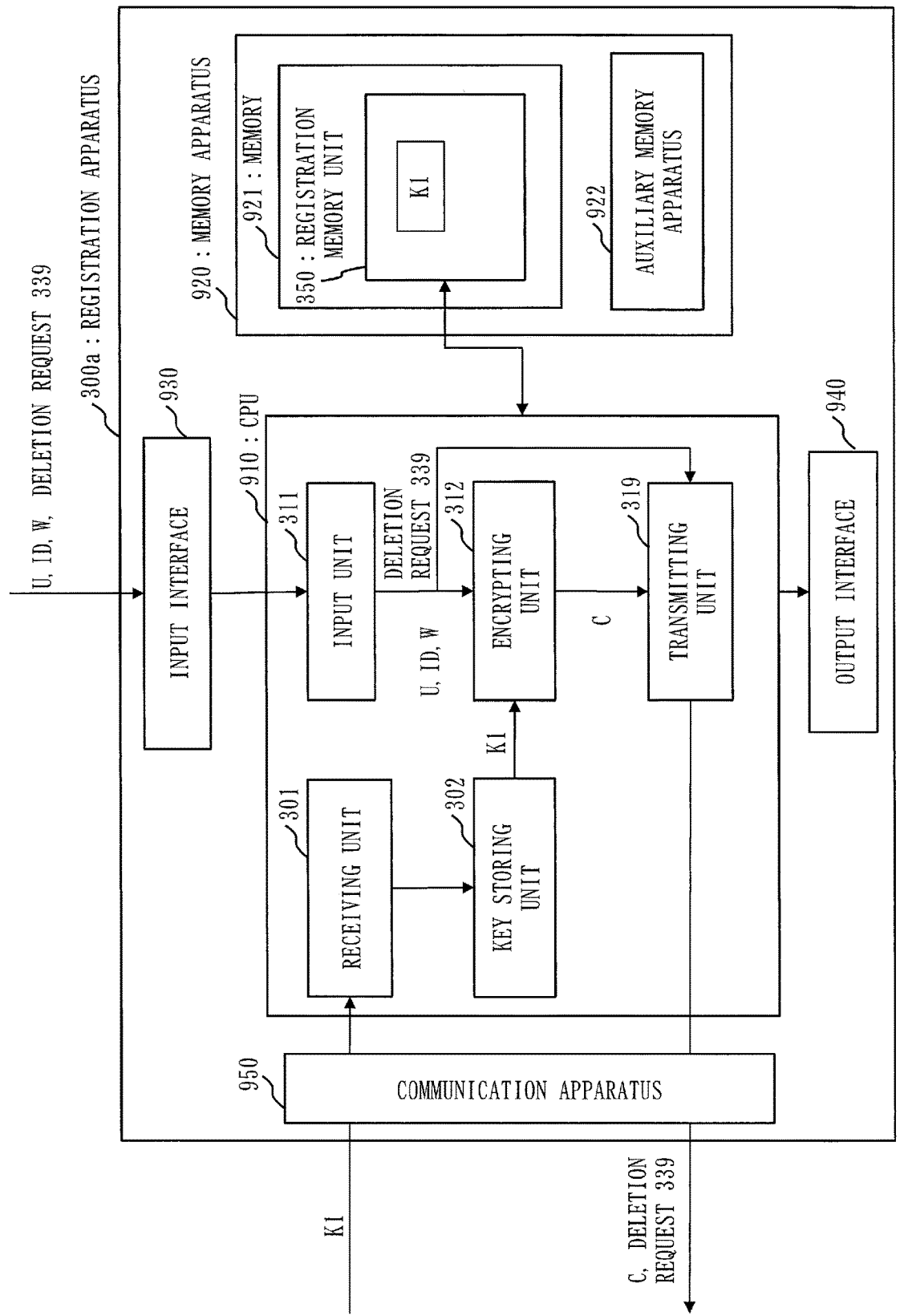
FIG. 16 is a configuration diagram of a registration apparatus 300a according to the second embodiment.

Next, using FIG. 16, the configuration and functions of the registration apparatus 300a according to the present embodiment will be described.

Figure 3:
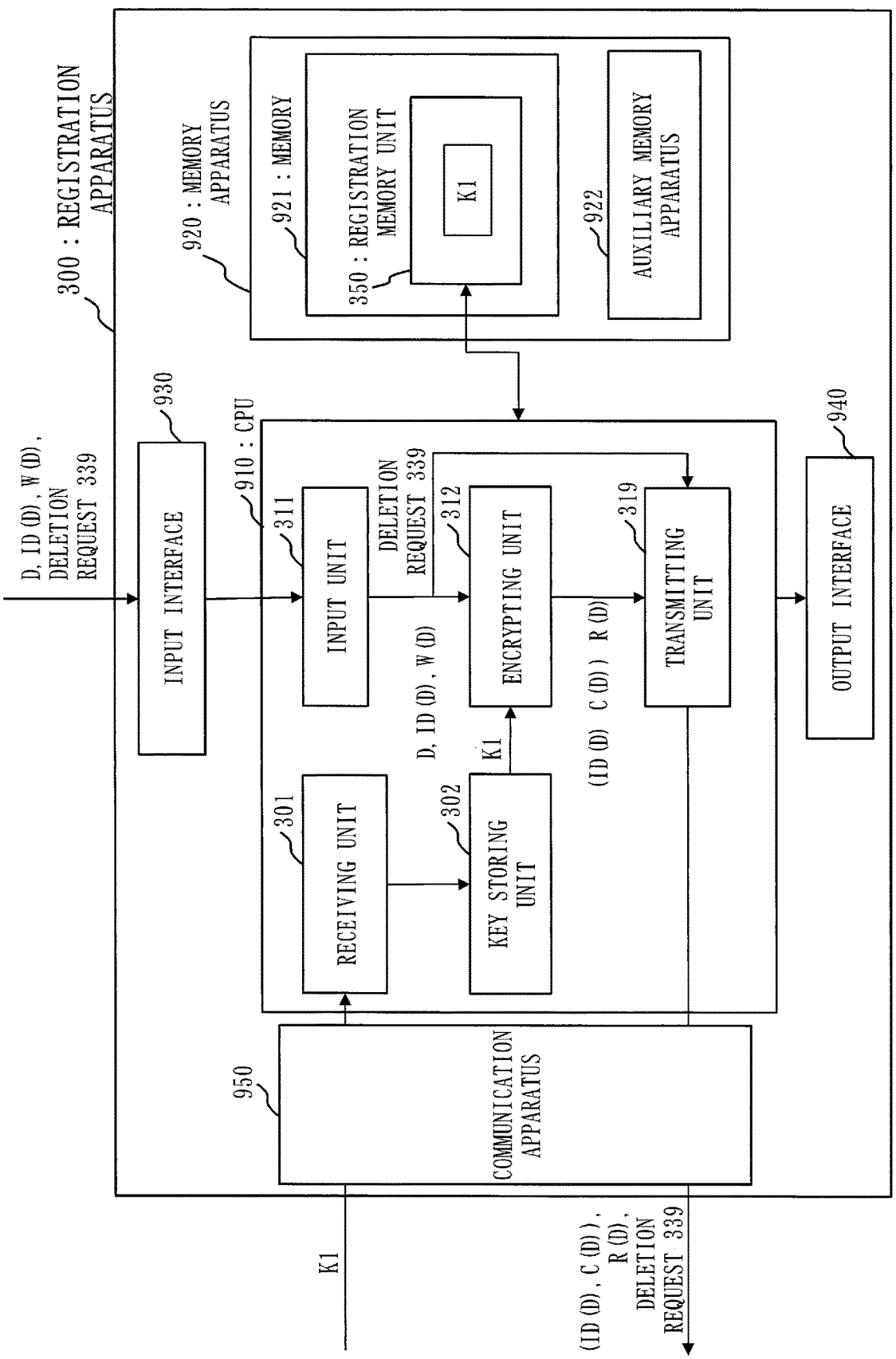
FIG. 3 is a configuration diagram of a registration apparatus 300 according to the first embodiment.

The configuration of the registration apparatus 300a according to the present embodiment is the same as that of FIG. 3 described in the first embodiment. Functions of the registration apparatus 300a that differ from those in the first embodiment are as follows.

The input unit 311 receives a set U of storage data D, a set ID of storage data names of the respective elements D of U, and a set W of associated keywords w to be associated with the respective elements D of U, which are inputted by a data registrant. In addition, the input unit 311 receives a deletion request 339 for deleting storage data D. In the present embodiment, the storage data name of storage data D may be represented as ID(D), and a set of associated keywords to be associated with storage data D may be represented as W(D).

The encrypting unit 312 receives a key K1 from the key storing unit 302, receives the set U of storage data D, the set ID of storage data names, and the set W of associated keywords w from the input unit 311, and encrypts the storage data D and the set W(D) of associated keywords to be associated with the storage data D, using the key K1.

The storage data D having been encrypted using the key K1 is encrypted data E(D). The associated keywords w having been encrypted using the key K1 are encrypted tags c. Note that the generation of the encrypted data E(D) may use a different key than the key K1.

Namely, the encrypting unit 312 generates a pair (ID(D), c) of a storage data name ID(D) and an encrypted tag c for all storage data D, the storage data names ID(D) of the D, and the set W(D) of associated keywords, which are received from the input unit 311. (ID(D), c) may be hereinafter written as encrypted storage data. Note that it is assumed that the encrypted data E(D) is associated with the storage data name ID(D). That is, it is assumed that the encrypted storage data (ID(D), c) represents a pair of the encrypted data E(D) associated with the storage data name ID(D) and the encrypted tag c. Note that a set of pieces of encrypted storage data (ID(D), c) generated by the encrypting unit 312 may be written as an encryption index C.

The transmitting unit 319 transmits the encryption index C received from the encrypting unit 312, to the management apparatus 500a. In addition, the transmitting unit 319 transmits a deletion request 339 received from the input unit 311, to the management apparatus 500a.

Other functions are the same as those described in the first embodiment.

<Search Apparatus 400a>

Next, using FIG. 17, the configuration and functions of the search apparatus 400a according to the present embodiment will be described.

Figure 4:
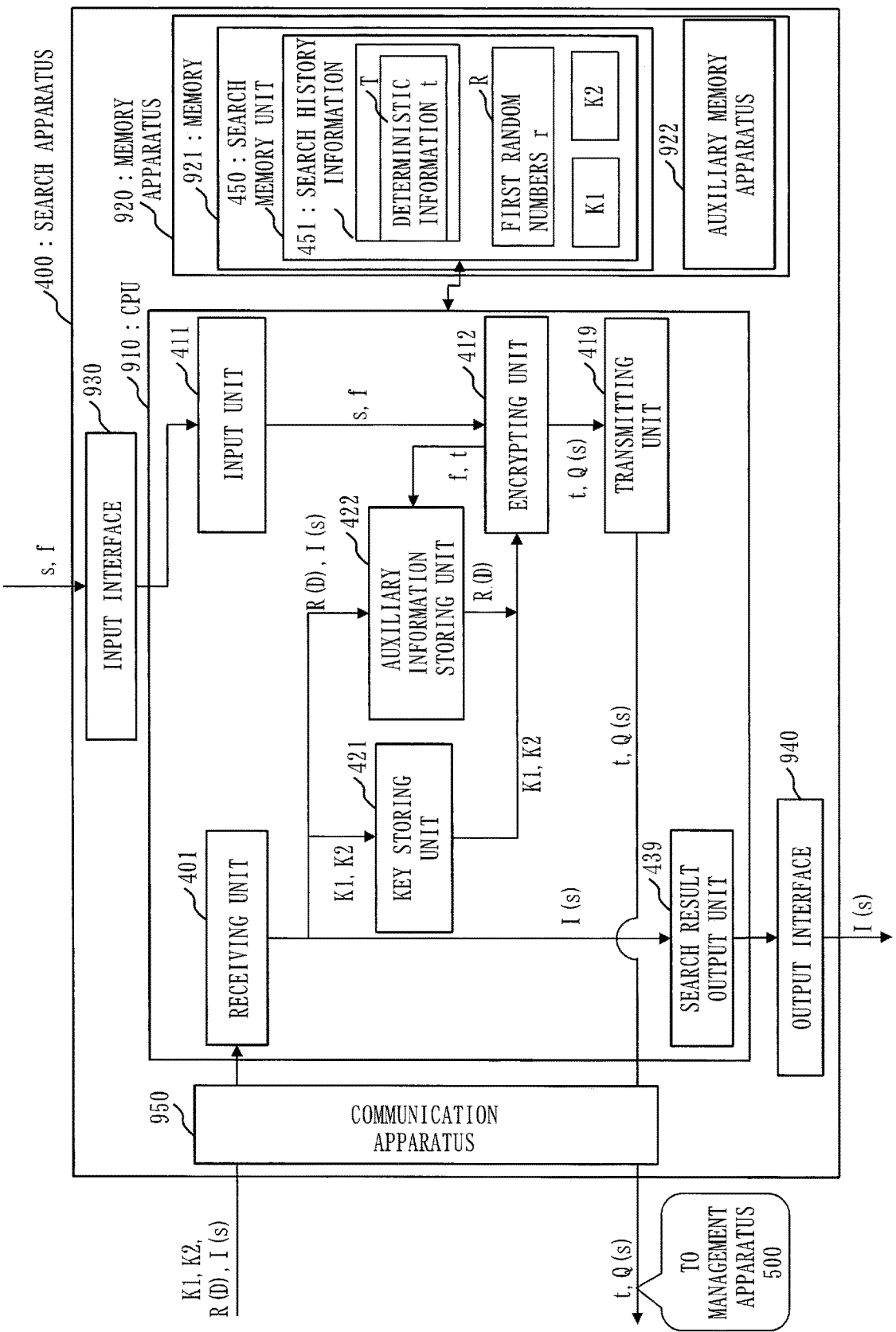
FIG. 4 is a configuration diagram of a search apparatus 400 according to the first embodiment.
Figure 17:
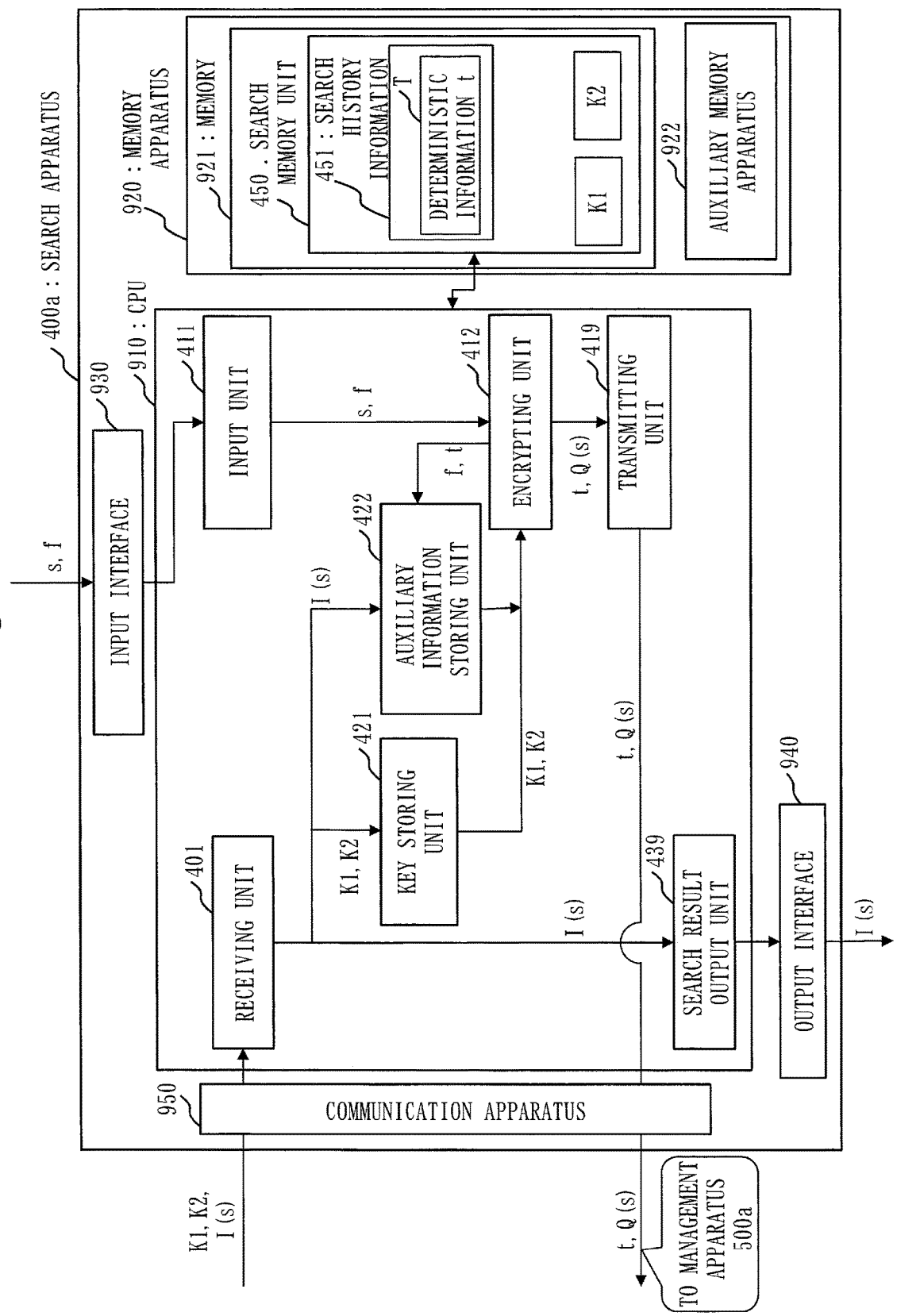
FIG. 17 is a configuration diagram of a search apparatus 400a according to the second embodiment.

FIG. 17 is a diagram corresponding to FIG. 4 described in the first embodiment. A configuration of FIG. 17 that differs from that of FIG. 4 is as follows. The search apparatus 400a according to the present embodiment does not store first random numbers R in the search memory unit 450. Other configurations are the same as those of FIG. 4.

In addition, functions of the search apparatus 400a that differ from those in the first embodiment are as follows.

The receiving unit 401 receives a key K1 and a key K2 which are transmitted from the key generation apparatus 200, or a search result I(s) transmitted from the management apparatus 500a.

The auxiliary information storing unit 422 stores search history information 451 in the search memory unit 450. Namely, the auxiliary information storing unit 422 receives a deterministic instruction f and deterministic information t of a search keyword s from the encrypting unit 412, and receives a search result I(s) for the search keyword s from the receiving unit 401. Then, when the auxiliary information storing unit 422 has been able to confirm that the management apparatus 500a has generated high-speed index information 554 which will be described later, the auxiliary information storing unit 422 accumulates the deterministic information t in the search history information 451. If the auxiliary information storing unit 422 cannot confirm the generation of the high-speed index information 554, the auxiliary information storing unit 422 does not perform anything. A set of all pieces of deterministic information t which are accumulated in the search history information 451 in the search memory unit 450 by the auxiliary information storing unit 422 is hereinafter written as T.

The encrypting unit 412 receives the key K1 and the key K2 from the key storing unit 421, the set T of deterministic information t from the auxiliary information storing unit 422, and the search keyword s and the deterministic instruction f from the input unit 411. The encrypting unit 412 outputs the deterministic information t of the search keyword or a search query Q(s) to the transmitting unit 419.

The functions of the receiving unit 401, the auxiliary information storing unit 422, and the encrypting unit 412 are the same as those of the first embodiment except that they do not handle first random numbers R. In addition, other functions are the same as those of the first embodiment.

<Management Apparatus 500a>

Figure 18:
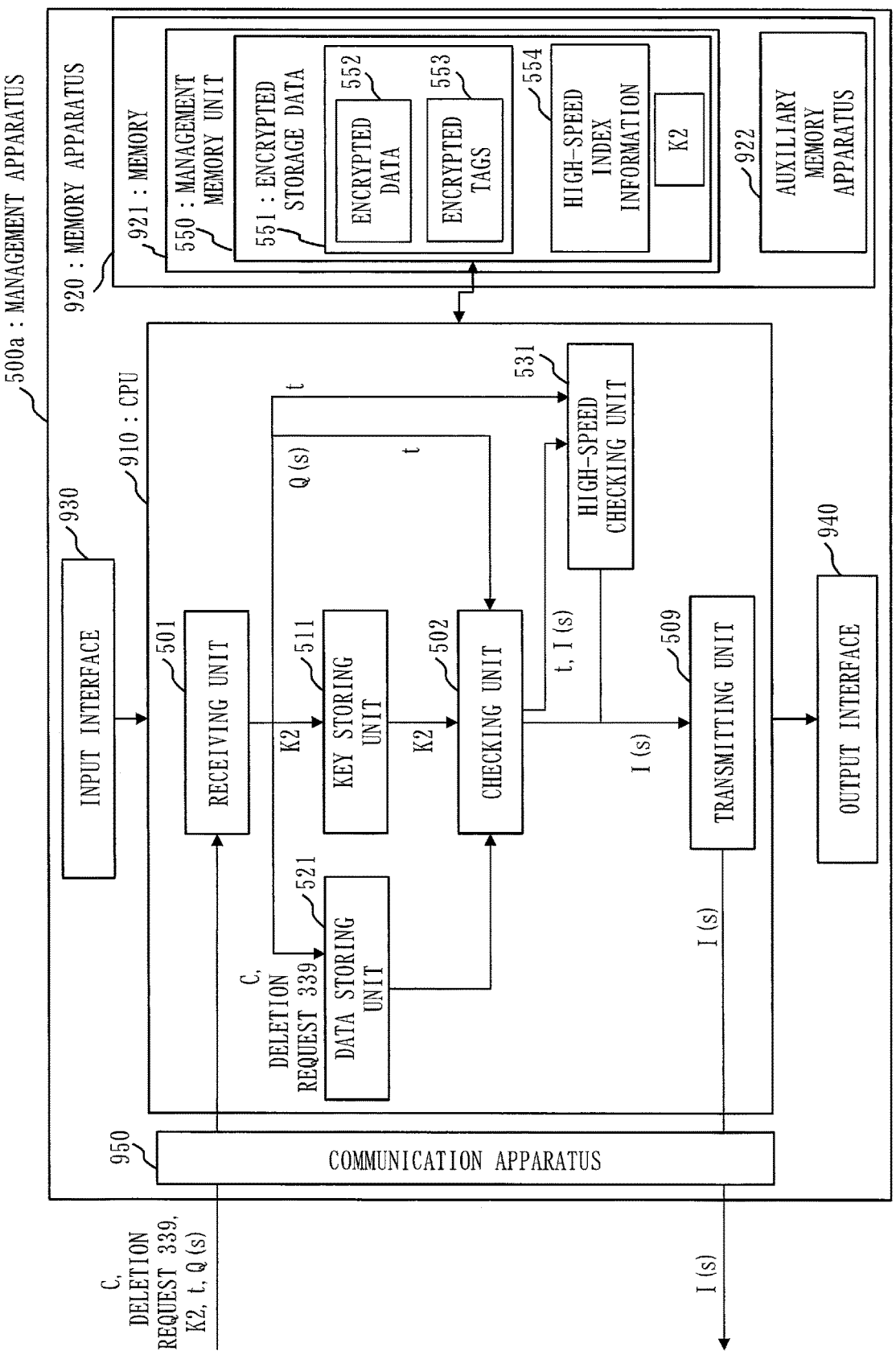
FIG. 18 is a configuration diagram of a management apparatus 500a according to the second embodiment.

Next, using FIG. 18, the configuration and functions of the management apparatus 500a according to the present embodiment will be described.

Figure 5:
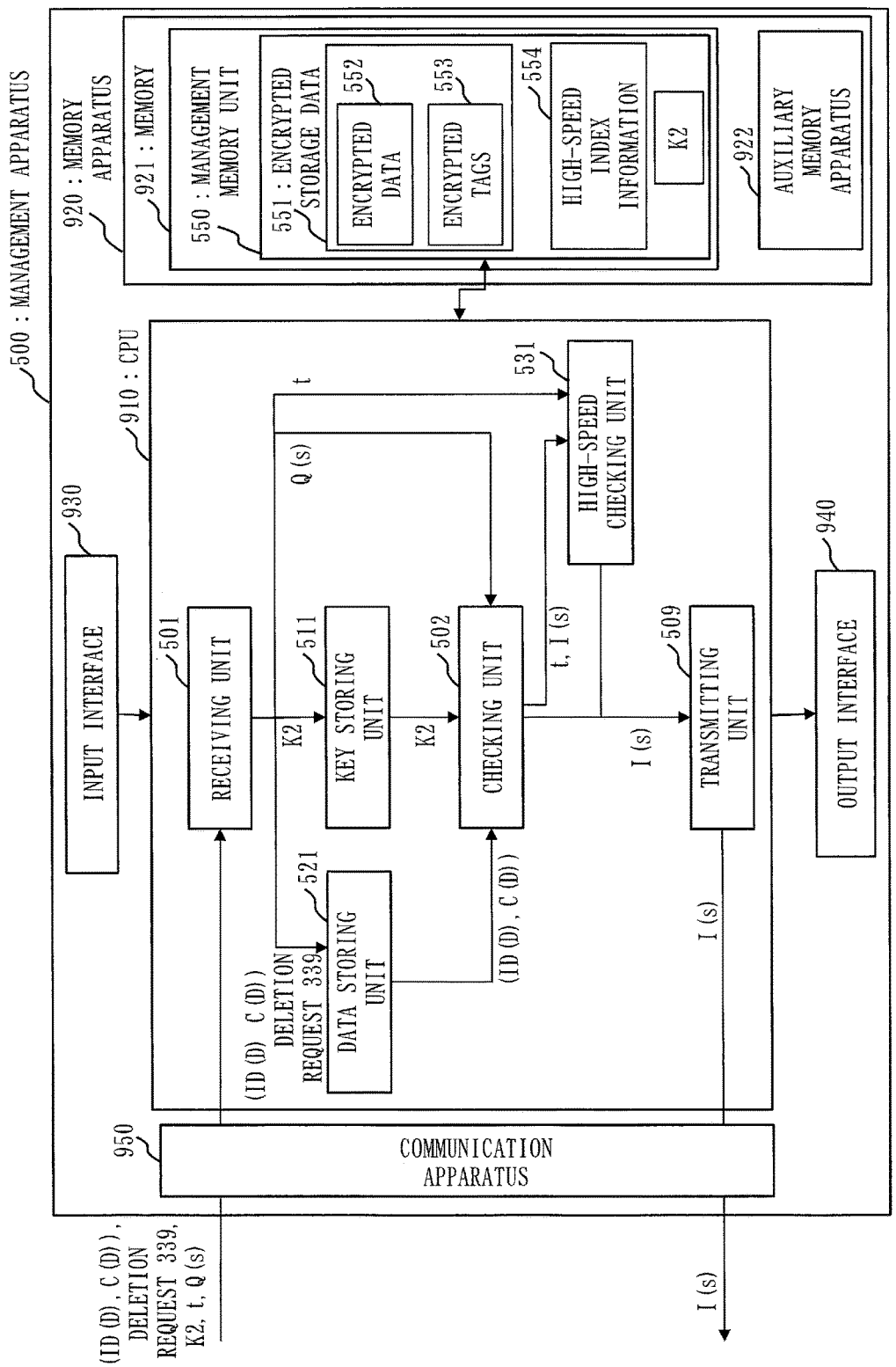
FIG. 5 is a configuration diagram of a management apparatus 500 according to the first embodiment.

The configuration of the management apparatus 500a according to the present embodiment is the same as that of FIG. 5 described in the first embodiment. Functions of the management apparatus 500a that differ from those in the first embodiment are as follows.

The receiving unit 501 receives a key K2 transmitted from the key generation apparatus 200, an encryption index C or a deletion request 339 which is transmitted from the registration apparatus 300a, and deterministic information t or a search query Q(s) which is transmitted from the search apparatus 400a.

The data storing unit 521 stores the encryption index C received from the receiving unit 501, in the management memory unit 550. In addition, the data storing unit 521 deletes encrypted storage data (ID(D), c) stored in the management memory unit 550, based on the deletion request 339 received from the receiving unit 501.

Note that, in the following description, the encrypted storage data (ID(D), c) may be described as encrypted storage data 551, encrypted data E(D) as encrypted data 552, and an encrypted tag c as an encrypted tag 553.

The checking unit 502 generates a search result I(s) for the search query Q(s) received from the receiving unit 501, the key K2 received from the key storing unit 511, and all encrypted storage data (ID(D), c) received from the data storing unit 521, and outputs the search result I(s) to the transmitting unit 509. In addition, when the search result I(s) is not an empty set, the checking unit 502 outputs the deterministic information t and the search result I(s) to the high-speed checking unit 531.

Other functions are the same as those of the first embodiment.

Hardware of each of the key generation apparatus 200, the registration apparatus 300a, the search apparatus 400a, and the management apparatus 500a which are included in the secret search system 100a according to the present embodiment is the same as that of the first embodiment.

*Description of Operation*

Next, a secret search process S100a by a secret search method 610 and a secret search program 620 for the secret search system 100a according to the present embodiment will be described.

As in the first embodiment, the secret search process S100a of the secret search system 100a includes a key generation and storage process S110, a registration process S120a, a search process S130a, and a deletion process S140.

<Key Generation and Storage Process S110>

The key generation and storage process S110 of the secret search system 100a according to the present embodiment is the same as that of FIG. 6 described in the first embodiment, and thus, description thereof is omitted.

<Registration Process S120a>

Figure 19:
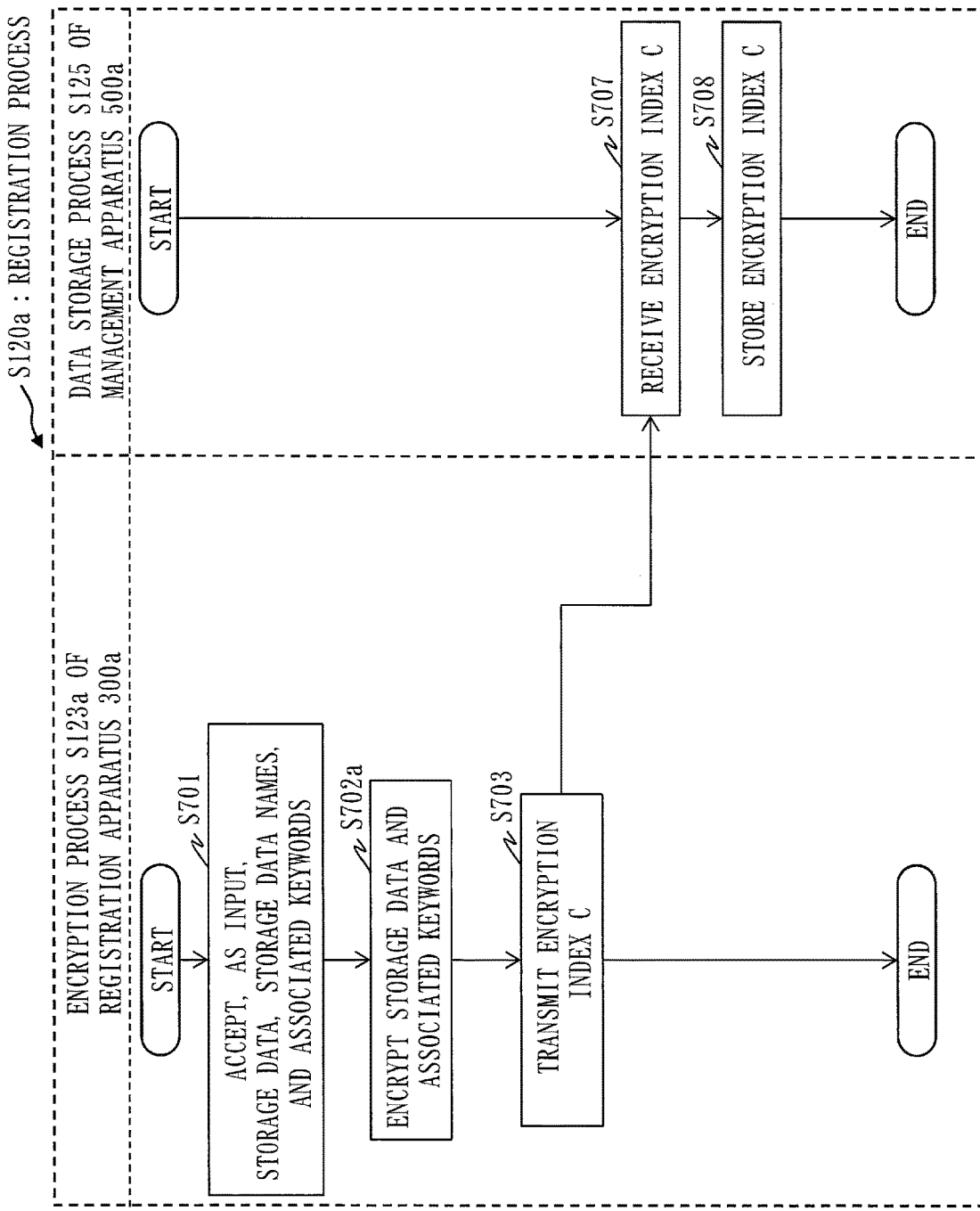
FIG. 19 is a flowchart of a registration process S120a of the secret search system 100a according to the second embodiment.

Using FIG. 19, the registration process S120a of the secret search system 100a according to the present embodiment will be described. FIG. 19 is a diagram corresponding to FIG. 7 described in the first embodiment. The same processes in FIG. 19 as those in FIG. 7 are denoted by the same reference signs and description thereof may be omitted.

Step S701, S702a, and S703 of FIG. 19 are an encryption process S123a which is performed by the registration apparatus 300a. Step S707 to S708 are a data storage process S125 which is performed by the management apparatus 500a. The present embodiment differs from the first embodiment in that there are no step S704 and no first random number storage process S124 of step S705 to S706.

In the encryption process S123a of the registration apparatus 300a, the registration apparatus 300a encrypts a set U of storage data, storage data names ID(D) of the respective elements D of U, and a set W(D) of associated keywords which are associated with the respective elements D of U, and thereby generates an encryption index C. In addition, the registration apparatus 300a transmits the encryption index C and encrypted data E(D) to the management apparatus 500a.

A specific description will be made below.

At step S701, the input unit 311 of the registration apparatus 300a receives, from a data registrant, storage data D, storage data names ID(D), and a set W(D) of associated keywords w to be associated with the storage data D, which are inputted from a keyboard, a mouse, or a memory apparatus. If there is no input of a storage data name ID(D) from the data registrant, the input unit 311 may assign a random number to a storage data name ID(D) of the inputted storage data D, or may assign integer values greater than 0 in turn such that the values do not overlap the storage data names of other storage data.

At step S702a, the encrypting unit 312 of the registration apparatus 300a receives a key K1 which is stored in the key storing unit 302 at step S605. In addition, the encrypting unit 312 receives the set U of storage data, the storage data names ID(D) of the respective elements D of U, and the set W(D) of associated keywords w for the respective elements D of U, which are inputted to the input unit 311 at step S701. Then, the encrypting unit 312 performs the following process.

One element of the set W(D) of associated keywords for storage data D is an associated keyword w. The encrypting unit 312 sets c such that c=E(K1, w, j) for all associated keywords w included in W. In addition, as (ID(D), c), encrypted storage data which is an element of the encryption index C is generated. Note, however, that j is a value that is assigned to w without overlapping. Specifically, when there is a keyword w associated with a plurality of pieces of storage data, an encrypted tag c=E(K1, w, j) is generated for each piece of storage data, and at this time, j is assigned without overlapping. Namely, considering a set of encrypted tags c, the elements of the set differ from each other except for negligible probability. j is specifically a counter value. When j is a counter value, for each keyword w, the counter value j is set as the initial value 1, and every time an encrypted tag c for the same keyword w is generated, 1 is added to j. j is specifically a hash-chain's hash value. When j is a hash value, for each keyword w, the hash value j is set as the initial value 1, and every time an encrypted tag c for the same keyword w is generated, j is updated to the hash value of j. Note that E is an encryption function. Specifically, E is a common key cryptosystem such as advanced encryption standard (AES), a message authentication code such as hash-based message authentication code (HMAC), or a hash function such as secure hash algorithm (SHA)-256.

The encrypting unit 312 of the registration apparatus 300a generates the encryption index C in the above-described manner.

Note that, for storage data D that does not have an associated keyword w associated therewith, encrypted storage data may be generated using j such as j>|U|, and added to the encryption index C. By this, the frequencies of appearance of storage data names in the encryption index C can also be made uniform. In addition, encrypted storage data may be generated for an associated keyword that is not associated with any storage data D, and added to the encryption index C. By this, the size of the encryption index C can also be adjusted.

At step S703, the transmitting unit 319 of the registration apparatus 300a transmits the encryption index C which is generated at step S702a, to the management apparatus 500a.

In the data storage process S125 of the management apparatus 500a, the management apparatus 500a receives encrypted data E(D) obtained by encrypting the storage data D, and the encryption index C generated by encrypting the associated keywords W(D) which are associated with the storage data D. Then, the management apparatus 500a stores the encrypted data E(D) and the encryption index C in the management memory unit 550.

A specific description will be made below.

At step S707, the receiving unit 501 of the management apparatus 500a receives, through the communication apparatus 950 of the management apparatus 500a, the encryption index C which is transmitted from the transmitting unit 319 of the registration apparatus 300a at step S703.

At step S708, the data storing unit 521 of the management apparatus 500a stores, in the management memory unit 550, the encryption index C which is received by the receiving unit 501 at step S707. As described above, the encryption index C is a set of pairs of encrypted data E(D) associated with a storage data name ID(D) and an encrypted tag c.

By the above, the registration process S120a of the secret search system 100a ends.

<Search Process S130a>

Figure 20:
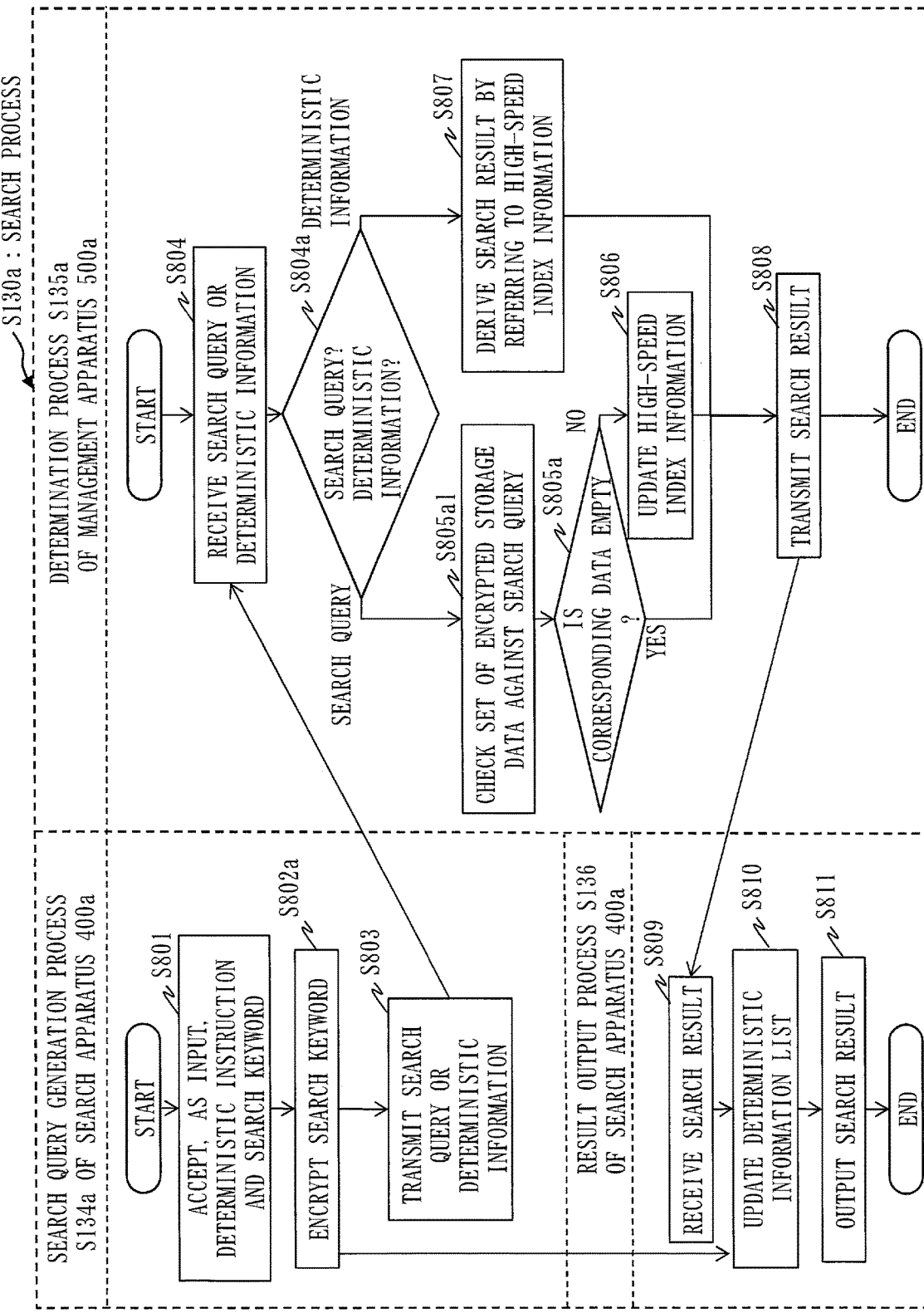
FIG. 20 is a flowchart of a search process S130a of the secret search system 100a according to the second embodiment.

Using FIG. 20, the search process S130a of the secret search system 100a according to the present embodiment will be described. FIG. 20 is a diagram corresponding to FIG. 8 described in the first embodiment. The same processes in FIG. 20 as those in FIG. 8 are denoted by the same reference signs and description thereof may be omitted.

Step S801 to S811 of FIG. 20 are processes performed by the search apparatus 400a and the management apparatus 500a. Step S801 to S803 are a search query generation process S134a which is performed by the search apparatus 400a. Step S804 to S808 are a determination process S135a which is performed by the management apparatus 500a. Step S809 to S811 are a result output process S136 which is performed by the search apparatus 400a.

In the search query generation process S134a of the search apparatus 400a, the search apparatus 400a obtains a search keyword s for searching for encrypted data E(D) stored in the management memory unit 550. The search apparatus 400a calculates deterministic information t which is uniquely determined by the search keyword s, and performs encryption of a probabilistic encryption scheme on the search keyword s using the deterministic information t, and thereby generates a search query Q(s). Then, the search apparatus 400a transmits the search query Q(s) to the management apparatus 500a.

A specific description will be made below.

At step S801, the input unit 411 of the search apparatus 400a receives a search keyword s and a deterministic instruction f which are inputted by a data searcher from a keyboard, a mouse, or a memory apparatus.

Here, the deterministic instruction f is to instruct whether to use deterministic information t upon encrypting the search keyword s, and is specifically a flag. The deterministic instruction f is also referred to as high-speed index generation flag. In addition, the use of deterministic information t upon encrypting the search keyword s indicates the embedding of the deterministic information t which is effective information for a high-speed search, in a search query Q(s).

When the search apparatus 400a obtains a deterministic instruction f and an instruction to use deterministic information t is given by the deterministic instruction f, the search apparatus 400a performs encryption of a probabilistic encryption scheme on the search keyword s using the deterministic information t.

In addition, when an instruction not to use deterministic information t is given by the deterministic instruction f, the search apparatus 400a performs encryption of a probabilistic encryption scheme on the search keyword s without using the deterministic information t. The process at step S801 is the same as that of the first embodiment.

At step S802a, the encrypting unit 412 of the search apparatus 400a receives the key K1 and the key K2 which are stored in the key storing unit 421 at step S607, a set T of deterministic information t which is managed by the auxiliary information storing unit 422, and the search keyword s and the deterministic instruction f which are inputted to the input unit 411 at step S801. The encrypting unit 412 performs the following process using the received data.

Figure 21:
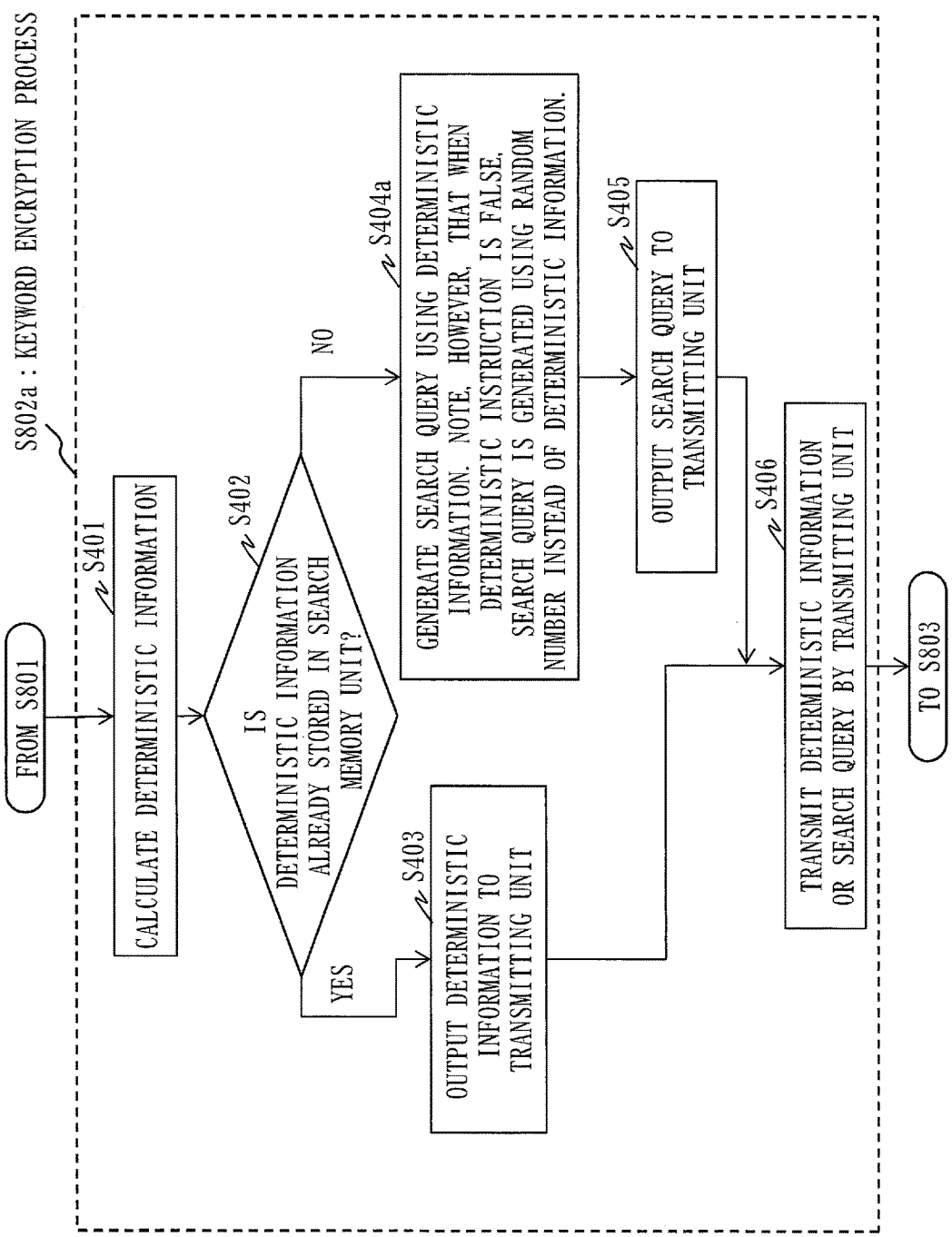
FIG. 21 is a flowchart of a keyword encryption process S802a in the search process S130a according to the second embodiment.

Using FIG. 21, the keyword encryption process S802a in the search process S130a according to the present embodiment will be described. FIG. 21 is a diagram corresponding to FIG. 9 described in the first embodiment. The same processes in FIG. 21 as those in FIG. 9 are denoted by the same reference signs and description thereof may be omitted.

At step S401, the search apparatus 400a performs encryption of a deterministic encryption scheme on the search keyword s and thereby calculates deterministic information t. Specifically, the encrypting unit 412 sets the deterministic information t of the search keyword s such that $t=E(K1, s)$. Note that for a key used to generate deterministic information t, a key different than K1 may be used.

At step S402, when the encrypting unit 412 has calculated deterministic information t at step S401, the encrypting unit 412 determines whether the calculated deterministic information t is accumulated in the search memory unit 450. If the calculated deterministic information t is accumulated in the search memory unit 450 (YES at S402), the encrypting unit 412 transmits the deterministic information t to the management apparatus 500a.

Specifically, the encrypting unit 412 checks whether the set T includes the calculated deterministic information t. If the set T includes the calculated deterministic information t, the encrypting unit 412 outputs the calculated deterministic information t to the transmitting unit 419 (step S403).

At step S404a, if the deterministic information t is not accumulated in the search memory unit 450 (NO at S402), i.e., if the set T does not include the calculated deterministic information t, the encrypting unit 412 transmits a search query Q(s) to the management apparatus 500a.

The encrypting unit 412 generates the search query Q(s) as follows. The encrypting unit 412 generates a random number and performs encryption of a probabilistic encryption scheme on the search keyword s using the deterministic information t. Specifically, the encrypting unit 412 sets a ciphertext di such that $di=E(K1, w, j)$, for the counter value j of 1 to the number of elements of the set U of storage data $(1<=j<|Y|)$. Then, for each ciphertext di, a ciphertext ki is set such that $ki=E(K2, di)$. Furthermore, a random number v is generated by a random number generator, and a ciphertext qi is set such that $qi=(E(ki,t||v)$. At this time, when the deterministic instruction f is false, a meaningless random number is used instead oft. Here, the ∥ operation represents the concatenation of a bit string. A set of the generated ciphertexts qi is written as Q(s). The set Q(s) of the ciphertexts qi is called a search query. Note that only one random number v may be included in Q(s) instead of being included in each qi. Finally, the encrypting unit 412 outputs the search query Q(s) to the transmitting unit 419 (step S405). In addition, the encrypting unit 412 outputs the deterministic instruction f and the deterministic information t to the auxiliary information storing unit 422.

Note that it is also possible that instead of including the random number v in the ciphertext qi, qi is set such that qi=E(ki, $0^\lambda$∥t∥vi). Upon a matching determination between the search query Q(s) and an encrypted tag c, if, as a result of decrypting the ciphertext qi, $0^\lambda$ appears in a plaintext, then it can be determined that they match, otherwise it can be determined that they do not match.

At step S406, the transmitting unit 419 transmits the deterministic information t or the search query Q(s) to the management apparatus 500*a*.

By the above, the process at step S802*a* ends, and processing proceeds to step S803 of FIG. 20. Note that at step S802*a*, the processes at step S401 to S403 and step S405 to S406 are the same as those of the first embodiment.

At step S803, the transmitting unit 419 of the search apparatus 400*a* transmits the deterministic information t or the search query Q(s) which is generated by the encrypting unit 412 at step S802*a*, to the management apparatus 500*a*.

By the above, the processes in the search query generation process S134*a* of the search apparatus 400*a* end, and processing proceeds to step S804.

In the determination process S135*a* of the management apparatus 500*a*, when the management apparatus 500*a* receives the search query Q(s) from the search apparatus 400*a*, the management apparatus 500*a* determines whether a search keyword s which is obtained by decrypting the search query Q(s) matches an associated keyword w which is obtained by decrypting an encrypted tag c stored in the management memory unit 550. If a search keyword s obtained by decrypting the search query Q(s) matches an associated keyword w obtained by decrypting an encrypted tag c, the management apparatus 500*a* transmits a search result I(s) including encrypted data E(D) associated with the encrypted tag c to the search apparatus 400*a*, and stores, in the management memory unit 550, deterministic information t which is obtained by decrypting the search query Q(s) and the encrypted data E(D) associated with the encrypted tag c such that they are associated with each other.

When the management apparatus 500*a* receives the deterministic information t from the search apparatus 400*a*, the management apparatus 500*a* obtains encrypted data E(D) associated with the deterministic information t from the management memory unit 550, and transmits a search result I(s) including the obtained encrypted data E(D) to the search apparatus 400*a*.

A specific description will be made below.

At step S804, the receiving unit 501 of the management apparatus 500*a* receives the deterministic information t or the search query Q(s) which is transmitted from the transmitting unit 419 of the search apparatus 400*a* at step S803.

At step S804*a*, it is determined whether the receiving unit 501 has received the search query or the deterministic information, and if the receiving unit 501 has received the search query Q(s), processing proceeds to step S805*a*1, and if the receiving unit 501 has received the deterministic information t, processing proceeds to step S807.

At step S805*a*1, if the information received by the receiving unit 501 at step S804 is the search query Q(s), the checking unit 502 of the management apparatus 500*a* performs the following process on the key K2 which is stored by the key storing unit 511 at step S609, and all encrypted storage data (ID(D), c) which is stored by the data storing unit 521 at step S708.

The checking unit 502 prepares an empty search result I(s). The checking unit 502 performs the following process on all encrypted storage data (ID(D), c) and the search query Q(s). A matching determination is performed on an arbitrary pair (c, q) of all encrypted tags c included in the encryption index C and all elements q of the search query Q(s) as follows. It is given that two "q" elements are e1 and e2. A ciphertext k is set such that k=E(K2, c). Using Dec which is a decryption function, m is set such that m=Dec(k, e1). m is divided into m1 and m2. When m2 matches e2, it is determined that c and q match. This namely indicates that an element that matches an element of the search query Q(s) is included in the encryption index C. At this time, m1 is the deterministic information t. When c and q match, a storage data name ID(D) is added to the search result I(s). Here, the addition of a storage data name ID(D) to the search result I(s) indicates the inclusion of encrypted data E(D) associated with the storage data name ID(D) in the search result I(s).

The above-described process is a process of determining whether a search keyword s obtained by decrypting the search query Q(s) matches an associated keyword w obtained by decrypting an encrypted tag c which is stored in the management memory unit 550.

If the search result I(s) is an empty set, i.e., YES at step S805*a*, the checking unit 502 outputs the search result I(s) to the transmitting unit 509. If the search result I(s) is not an empty set, i.e., NO at step S805*a*, the checking unit 502 outputs m1 which is the deterministic information t and the search result I(s) to the high-speed checking unit 531.

At step S806, the high-speed checking unit 531 of the management apparatus 500*a* stores, in the management memory unit 550, the deterministic information t which is obtained by decrypting the search query Q(s) and the search result I(s) such that they are associated with each other. Specifically, the high-speed checking unit 531 accepts, as input, the deterministic information t and the search result I(s) which are received from the checking unit 502 at step S805*a*1. Then, the high-speed checking unit 531 stores, in the management memory unit 550, high-speed index information 554 that allows to retrieve the search result I(s) at high speed with the deterministic information t being a key. The high-speed index information 554 is specifically implemented by using a hash table.

At step S807, if the information received by the receiving unit 501 at step S804 is the deterministic information t, the high-speed checking unit 531 of the management apparatus 500*a* receives the deterministic information t from the receiving unit 501. The high-speed checking unit 531 extracts, for the received deterministic information t, a corresponding search result I(s) from the high-speed index information 554, and outputs I(s) to the transmitting unit 509. If there is no corresponding search result I(s) for the received deterministic information t, the high-speed checking unit 531 outputs an empty set as I(s) to the transmitting unit 509.

At step S808, the transmitting unit 509 of the management apparatus 500*a* transmits the search result I(s) received from the checking unit 502 or high-speed checking unit 531, to the search apparatus 400*a*.

By the above, the processes in the determination process S135a of the management apparatus 500a end, and processing proceeds to step S809. Note that the processes at step S803, S804, and S804a are the same as those of the first embodiment. In addition, the processes at step S805a, S806, S807, and S808 are the same as those of the first embodiment.

In the result output process S136 of the search apparatus 400a, when the search apparatus 400a receives the search result I(s) from the management apparatus 500a, the search apparatus 400a accumulates the deterministic information tin the search memory unit 450. The result output process S136 of step S809 to S811 is the same as that of the first embodiment.

By the above, the search process S130a of the secret search system 100a ends.

Note that a deletion process S140 of the secret search system 100a is the same as the process of FIG. 10 described in the first embodiment, and thus, description thereof is omitted.

\*\*\*Description of Advantageous Effects of the Present Embodiment\*\*\*

A secret search system according to the present embodiment includes an encrypting unit of a search apparatus that generates a search query having embedded therein information useful for performing a high-speed search; and a receiving unit of a management apparatus that receives the search query. In addition, the secret search system includes a data storing unit of the management apparatus that stores encrypted tags obtained by encrypting associated keywords; and a checking unit of the management apparatus that extracts an encrypted tag that matches an encrypted search keyword from among a set of the stored encrypted tags. Thus, the secret search system according to the present embodiment can search for an encrypted tag, using a probabilistic search query having embedded therein deterministic information for speeding up a search process. In addition, in the secret search system according to the present embodiment, search queries are generated by probabilistic encryption. Thus, the search queries do not depend on the deterministic information of search keywords. By this, the resistance to frequency analysis of the search queries increases and thus the search queries have a high level of security.

In addition, in the secret search system according to the present embodiment, encrypted tags are generated by deterministic encryption, and upon generating encrypted tags c, a counter value j is inputted for the same associated keyword w without overlapping, by which encrypted tags c for the same associated keyword w do not overlap, either. Namely, by using the counter value, a ciphertext always changes, avoiding frequency analysis. By this, the resistance to frequency analysis of encrypted tags increases and thus the encrypted tags have a high level of security. In addition, in the secret search system according to the present embodiment, it becomes unnecessary for the search apparatus to store first random numbers r.

Third Embodiment

In the present embodiment, differences from the second embodiment will be mainly described.

In the present embodiment, portions common to those in the second embodiment are denoted by the same reference signs and description thereof may be omitted.

\*\*\*Description of Configuration\*\*\*

Figure 22:
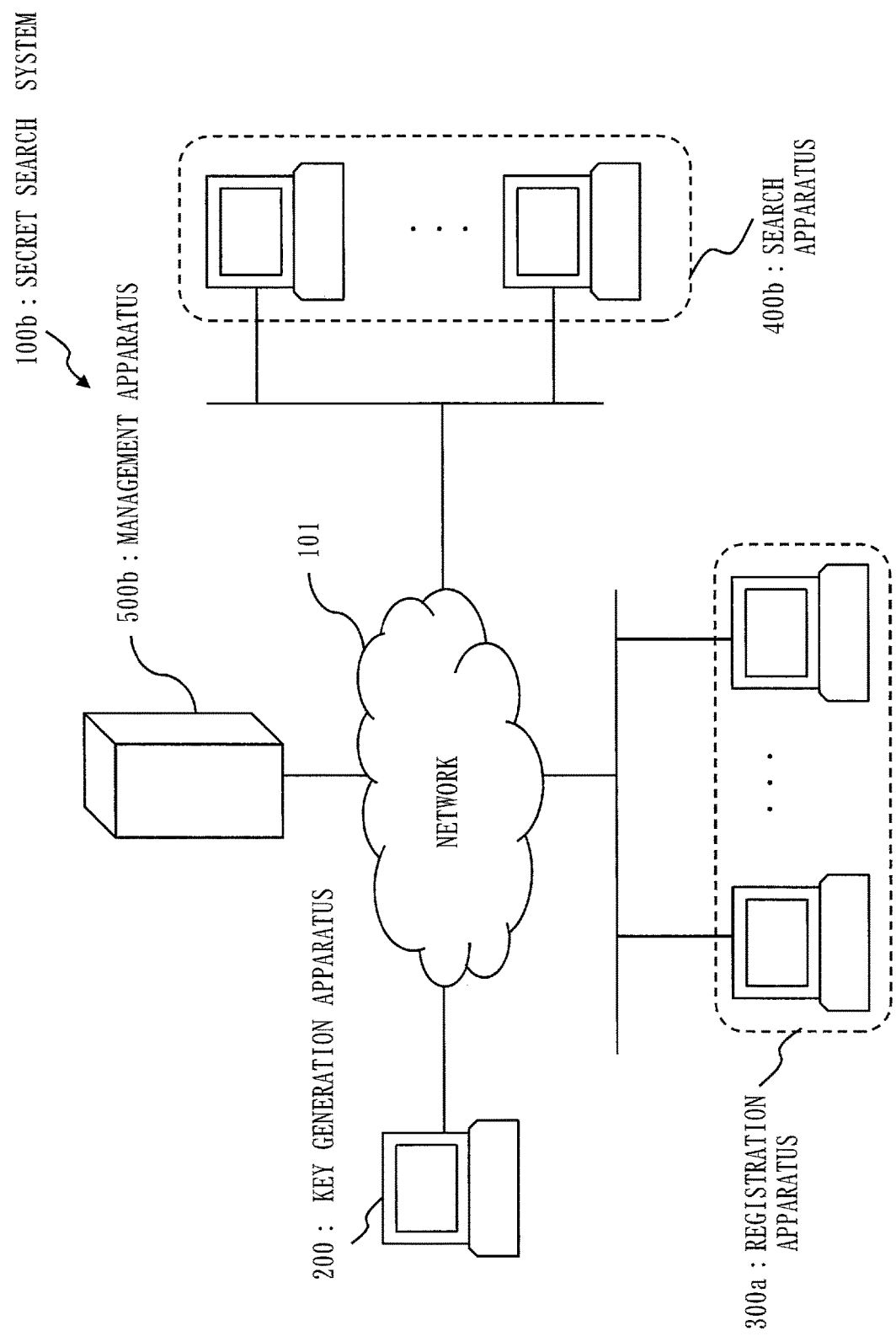
FIG. 22 is a configuration diagram of a secret search system 100b according to a third embodiment.

Using FIG. 22, a configuration of a secret search system 100b according to the present embodiment will be described.

The secret search system 100b includes a key generation apparatus 200, registration apparatuses 300a, search apparatuses 400b, and a management apparatus 500b. FIG. 22 corresponds to FIG. 15 described in the second embodiment. The basic configuration and functions of the secret search system 100b are the same as those of FIG. 15 described in the second embodiment, and thus, description thereof is omitted.

In addition, the configuration and functions of each of the key generation apparatus 200 and the registration apparatus 300a are the same as those of the second embodiment and thus description thereof is omitted.

In addition, the configuration of each of the search apparatus 400b and the management apparatus 500b is the same as that of the second embodiment and thus description thereof is omitted. Note that in the search apparatus 400b the function of the encrypting unit 412 differs from that of the second embodiment. Note also that in the management apparatus 500b the function of the checking unit 502 differs from that of the second embodiment.

In the secret search system 100b according to the present embodiment, unlike the second embodiment, a search query is composed of two ciphertexts: a first ciphertext $Q1(s)$ and a second ciphertext $Q2(s)$. The first ciphertext $Q1(s)$ is a ciphertext that can determine whether the ciphertext matches an encrypted tag. The second ciphertext $Q2(s)$ is a ciphertext that allows to compute deterministic information using an encrypted tag that matches the first ciphertext $Q1(s)$. The first ciphertext $Q1(s)$ is also referred to as ciphertext for a search. The second ciphertext $Q2(s)$ is also referred to as ciphertext for a high-speed re-search.

The search apparatus 400b performs encryption of a probabilistic encryption scheme on a search keyword using a random number and a counter value. The search apparatus 400b generates a first ciphertext $Q1(s)$ to determine whether the first ciphertext $Q1(s)$ matches an encrypted tag, and a second ciphertext $Q2(s)$ for calculating deterministic information using the encrypted tag that matches the first ciphertext $Q1(s)$.

\*\*\*Description of Operation\*\*\*

Next, a secret search process S100b by a secret search method 610 and a secret search program 620 for the secret search system 100b according to the present embodiment will be described.

As in the second embodiment, the secret search process S100b of the secret search system 100b includes a key generation and storage process S110, a registration process S120a, a search process S130b, and a deletion process S140.

Each of the key generation and storage process S110, the registration process S120a, and the deletion process S140 is the same as that of the second embodiment and thus description thereof is omitted.

<Search Process S130b>

Figure 23:
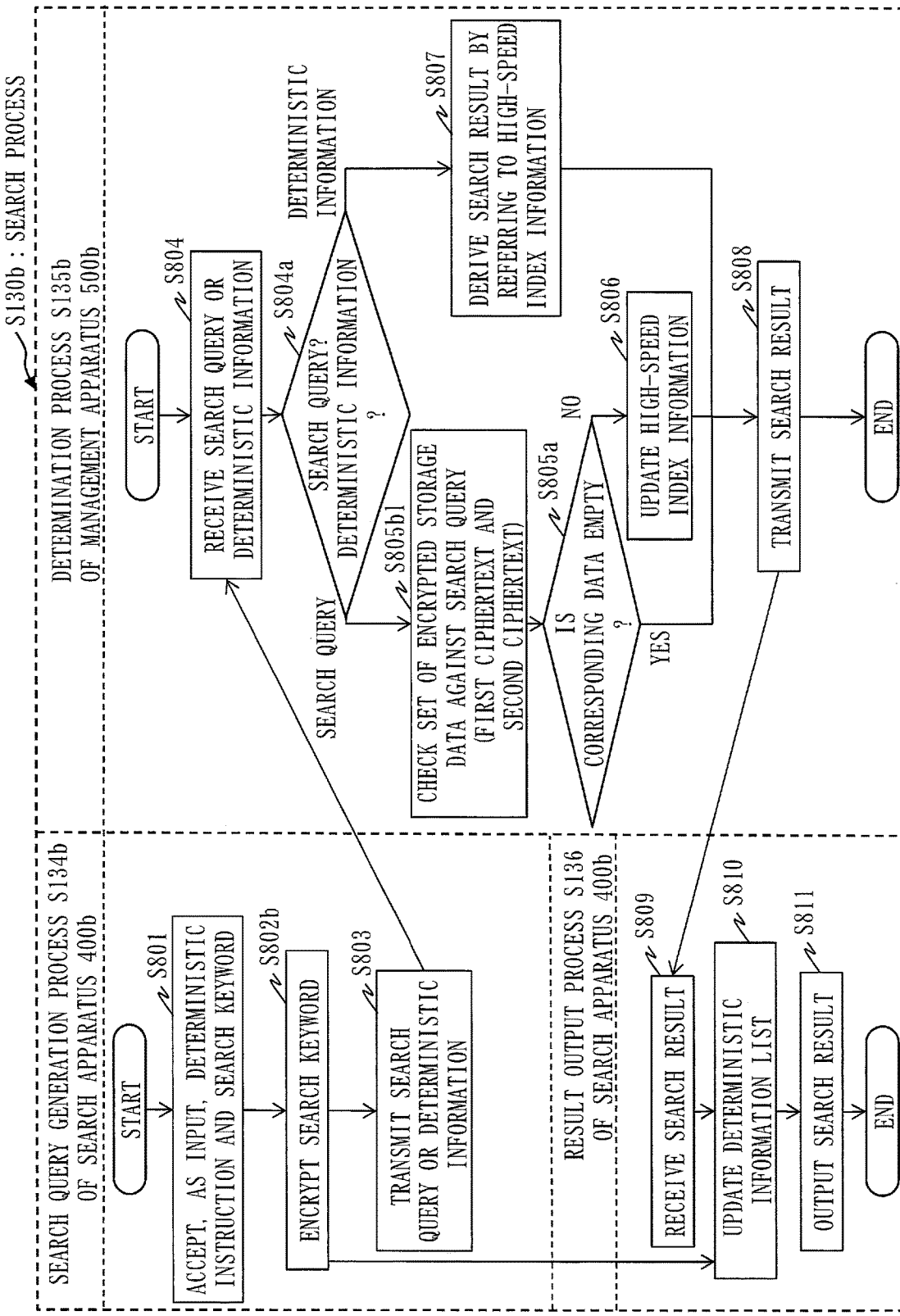
FIG. 23 is a flowchart of a search process S130b of the secret search system 100b according to the third embodiment.

Using FIG. 23, the search process S130b of the secret search system 100b according to the present embodiment will be described. FIG. 23 is a diagram corresponding to FIG. 20 described in the second embodiment. The same processes in FIG. 23 as those in FIG. 20 are denoted by the same reference signs and description thereof may be omitted.

Step S801 to S811 of FIG. 23 are processes performed by the search apparatus 400b and the management apparatus 500b. Step S801 to S803 are a search query generation process S134b which is performed by the search apparatus 400b. Step S804 to S808 are a determination process S135b which is performed by the management apparatus 500b. Step S809 to S811 are a result output process S136 which is performed by the search apparatus 400b.

In the search query generation process S134b of the search apparatus 400b, the search apparatus 400b obtains a search keyword s for searching for encrypted data E(D) stored in the management memory unit 550. The search apparatus 400b calculates deterministic information t which is uniquely determined by the search keyword s, and performs encryption of a probabilistic encryption scheme on the search keyword s using the deterministic information t, and thereby generates a search query Q(s). Then, the search apparatus 400b transmits the search query Q(s) to the management apparatus 500b.

A specific description will be made below.

A process at step S801 is the same as that of the second embodiment.

At step S802b, the encrypting unit 412 of the search apparatus 400b receives the key K1 and the key K2 which are stored in the key storing unit 421 at step S607, a set T of deterministic information t which is managed by the auxiliary information storing unit 422, and the search keyword s and the deterministic instruction f which are inputted to the input unit 411 at step S801. The encrypting unit 412 performs the following process using the received data.

Figure 24:
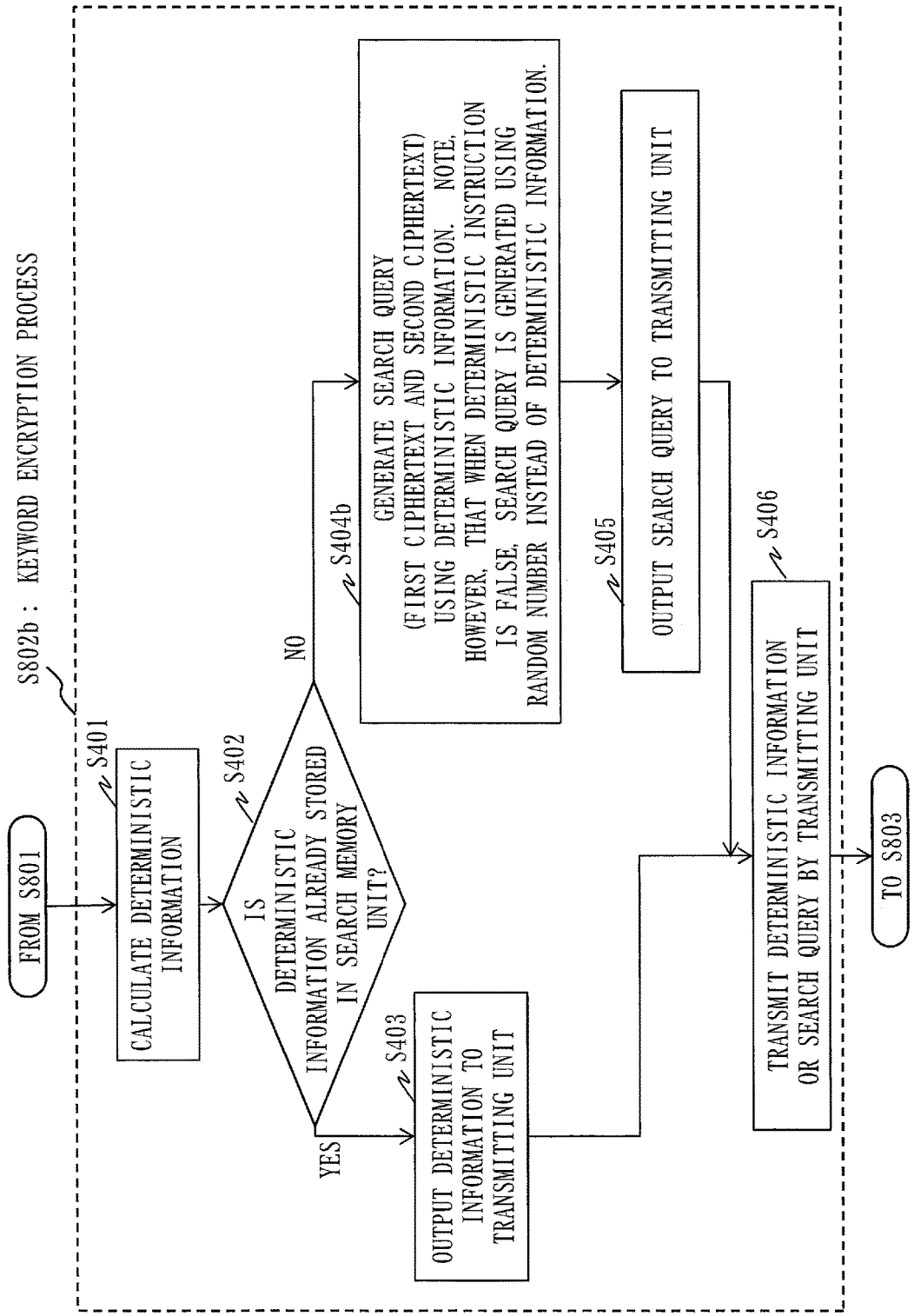
FIG. 24 is a flowchart of a keyword encryption process S802b in the search process S130b according to the third embodiment.

Using FIG. 24, the keyword encryption process S802b in the search process S130b according to the present embodiment will be described. FIG. 24 is a diagram corresponding to FIG. 21 described in the second embodiment. The same processes in FIG. 24 as those in FIG. 21 are denoted by the same reference signs and description thereof may be omitted.

At step S401, the search apparatus 400b performs encryption of a deterministic encryption scheme on the search keyword s and thereby calculates deterministic information t. Specifically, the encrypting unit 412 sets the deterministic information t of the search keyword s such that t=E(K1, s). Note that for a key used to generate deterministic information t, a key different than K1 may be used.

At step S402, when the encrypting unit 412 has calculated deterministic information t at step S401, the encrypting unit 412 determines whether the calculated deterministic information t is accumulated in the search memory unit 450. If the calculated deterministic information t is accumulated in the search memory unit 450 (YES at S402), the encrypting unit 412 transmits the deterministic information t to the management apparatus 500b.

Specifically, the encrypting unit 412 checks whether the set T includes the calculated deterministic information t. If the set T includes the calculated deterministic information t, the encrypting unit 412 outputs the calculated deterministic information t to the transmitting unit 419 (step S403).

The processes at step S401 to S403 are the same as those of the second embodiment.

At step S404b, if the deterministic information t is not accumulated in the search memory unit 450 (NO at S402), i.e., if the set T does not include the calculated deterministic information t, the encrypting unit 412 transmits a search query Q(s) to the management apparatus 500b.

The encrypting unit 412 generates the search query Q(s) as follows. The search query Q(s) is composed of two elements, i.e., a first ciphertext Q1(s) and a second ciphertext Q2(s). The encrypting unit 412 generates a random number v by a random number generator, and performs encryption of a probabilistic encryption scheme on the search keyword s using the deterministic information t.

Specifically, the encrypting unit 412 sets a ciphertext dj such that dj=E(K1, s, j), for the counter value j of 1 to the number of elements of a set U of storage data (1<=j<|U|). Then, for each ciphertext dj, a ciphertext Q1j(s) is set such that Q1j(s)=(E(K2, dj, v), v). Furthermore, a ciphertext Q2j(s) is set such that Q2j(s)=F(dj, t||vj). Note, however, that vj is a random number and may be generated for each Q2j(s) or may be generated for each Q(s). In addition, the encryption F is an encryption algorithm in which a decryption process can be performed by a private key dj. For example, the encryption F may be AES. At this time, when the deterministic instruction f is false, a meaningless random number is used instead oft. Here, the || operation represents the concatenation of a bit string. A set of the generated ciphertexts qj=(Q1j(s), Q2j(s)) is written as Q(s). The set Q(s) of the ciphertexts qj is called a search query. Note that only one random number v may be included in Q(s) instead of being included in each of Q1j(s) and Q2j(s). Finally, the encrypting unit 412 outputs the search query Q(s) to the transmitting unit 419 (step S405). In addition, the encrypting unit 412 outputs the deterministic instruction f and the deterministic information t to the auxiliary information storing unit 422.

At step S406, the transmitting unit 419 transmits the deterministic information t or the search query Q(s) to the management apparatus 500b.

By the above, the process at step S802b ends, and processing proceeds to step S803 of FIG. 23. Note that at step S802b, the processes at step S401 to S403 and step S405 to S406 are the same as those of the second embodiment.

At step S803, the transmitting unit 419 of the search apparatus 400b transmits the deterministic information t or the search query Q(s) which is generated by the encrypting unit 412 at step S802b, to the management apparatus 500b.

By the above, the processes in the search query generation process S134b of the search apparatus 400b end, and processing proceeds to step S804.

In the determination process S135b of the management apparatus 500b, when the management apparatus 500b receives the search query Q(s) from the search apparatus 400b, the management apparatus 500b determines whether a search keyword s which is obtained by decrypting the search query Q(s) matches an associated keyword w which is obtained by decrypting an encrypted tag c stored in the management memory unit 550. If a search keyword s obtained by decrypting the search query Q(s) matches an associated keyword w obtained by decrypting an encrypted tag c, the management apparatus 500b transmits a search result I(s) including encrypted data E(D) associated with the encrypted tag c to the search apparatus 400b, and stores, in the management memory unit 550, deterministic information t which is obtained by decrypting the search query Q(s) and the encrypted data E(D) associated with the encrypted tag c such that they are associated with each other.

When the management apparatus 500b receives the deterministic information t from the search apparatus 400b, the management apparatus 500b obtains encrypted data E(D) associated with the deterministic information t from the management memory unit 550, and transmits a search result I(s) including the obtained encrypted data E(D) to the search apparatus 400b.

A specific description will be made below.

At step S804, the receiving unit 501 of the management apparatus 500b receives the deterministic information t or the search query Q(s) which is transmitted from the transmitting unit 419 of the search apparatus 400b at step S803.

At step S804a, it is determined whether the receiving unit 501 has received the search query or the deterministic information, and if the receiving unit 501 has received the search query Q(s), processing proceeds to step S805b1, and if the receiving unit 501 has received the deterministic information t, processing proceeds to step S807.

At step S805b1, if the information received by the receiving unit 501 at step S804 is the search query Q(s), the checking unit 502 of the management apparatus 500b performs the following process on the key K2 which is stored by the key storing unit 511 at step S609, and all encrypted storage data (ID(D), c) which is stored by the data storing unit 521 at step S708.

The checking unit 502 prepares an empty search result I(s). The checking unit 502 performs the following process on all encrypted storage data (ID(D), c) and the search query Q(s).

A matching determination is performed on all encrypted tags c included in an encryption index C and all elements $Q1j$ ($1<=j<=|U|$) of the search query Q(s) as follows. First, using a random number v included in $Q1j$, $c'=E(K2, c, v)$ is computed for all encrypted tags c. Then, $Q1j$ that is included in all computed c' is found. This process is a process of computing a common part between $Q1j$ and $c'$, and it is efficiently computed by sorting, a binary tree search, a HashMap, or the like. At this time, it is determined that the computed $Q1j$ matches c. This indicates that an element that matches an element of the search query Q(s) is included in the encryption index C. Namely, it is determined that the first ciphertext Q1(s) matches the encrypted tag c.

Here, of $Q1j$, one $Q1j$ that is included in c' is selected and the selected $Q1j$ is set as $Q1j'$. Then, for c corresponding to c' that matches $Q1j'$, m is set such that $m=Dec(c, Q2j')$. At this time, m is the deterministic information t. Namely, the second ciphertext Q2(s) is used to calculate deterministic information t using the encrypted tag c that matches the first ciphertext Q1(s). When c and $Q1j$ match, a storage data name ID(D) associated with the c is added to the search result I(s). Here, the addition of a storage data name ID(D) to the search result I(s) indicates the inclusion of encrypted data E(D) associated with the storage data name ID(D) in the search result I(s).

The above-described process is a process of determining whether a search keyword s obtained by decrypting the search query Q(s) matches an associated keyword w obtained by decrypting an encrypted tag c which is stored in the management memory unit 550.

If the search result I(s) is an empty set, i.e., YES at step S805a, the checking unit 502 outputs the search result I(s) to the transmitting unit 509. If the search result I(s) is not an empty set, i.e., NO at step S805a, the checking unit 502 outputs m which is the deterministic information t and the search result I(s) to the high-speed checking unit 531.

At step S806, the high-speed checking unit 531 of the management apparatus 500b stores, in the management memory unit 550, the deterministic information t which is obtained by decrypting the search query Q(s) and the search result I(s) such that they are associated with each other. Specifically, the high-speed checking unit 531 accepts, as input, the deterministic information t and the search result I(s) which are received from the checking unit 502 at step S805b1. Then, the high-speed checking unit 531 stores, in the management memory unit 550, high-speed index information 554 that allows to retrieve the search result I(s) at high speed with the deterministic information t being a key. The high-speed index information 554 is specifically implemented by using a hash table.

At step S807, if the information received by the receiving unit 501 at step S804 is the deterministic information t, the high-speed checking unit 531 of the management apparatus 500b receives the deterministic information t from the receiving unit 501. The high-speed checking unit 531 extracts, for the received deterministic information t, a corresponding search result I(s) from the high-speed index information 554, and outputs I(s) to the transmitting unit 509. If there is no corresponding search result I(s) for the received deterministic information t, the high-speed checking unit 531 outputs an empty set as I(s) to the transmitting unit 509.

At step S808, the transmitting unit 509 of the management apparatus 500b transmits the search result I(s) received from the checking unit 502 or the high-speed checking unit 531, to the search apparatus 400b.

By the above, the processes in the determination process S135b of the management apparatus 500b end, and processing proceeds to step S809. Note that the processes at step S803, S804, and S804a are the same as those of the second embodiment. In addition, the processes at step S805a, S806, S807, and S808 are the same as those of the second embodiment.

In the result output process S136 of the search apparatus 400b, when the search apparatus 400b receives the search result I(s) from the management apparatus 500b, the search apparatus 400b accumulates the deterministic information t in the search memory unit 450. The result output process S136 of step S809 to S811 is the same as that of the second embodiment.

By the above, the search process S130b of the secret search system 100b ends.

\*\*\*Description of Advantageous Effects of the Present Embodiment\*\*\*

A secret search system according to the present embodiment includes an encrypting unit of a search apparatus that generates a search query having embedded therein information useful for performing a high-speed search; and a receiving unit of a management apparatus that receives the search query. In addition, the secret search system includes a data storing unit of the management apparatus that stores encrypted tags obtained by encrypting associated keywords; and a checking unit of the management apparatus that extracts an encrypted tag that matches an encrypted search keyword from among a set of the stored encrypted tags. Thus, the secret search system according to the present embodiment can search for an encrypted tag, using a probabilistic search query having embedded therein deterministic information for speeding up a search process. In addition, in the secret search system according to the present embodiment, search queries are generated by probabilistic encryption. Thus, the search queries do not depend on the deterministic information of search keywords. By this, the resistance to frequency analysis of the search queries increases and thus the search queries have a high level of security.

Furthermore, in the secret search system according to the present embodiment, a search is performed using a process of finding a common part between two sets, and thus, efficient computing is performed by sorting, a binary tree search, a HashMap, or the like. Thus, according to the secret search system according to the present embodiment, a search can be performed at a higher speed and thus is efficient.

The first to third embodiments are described above. The first to third embodiments describe a case in which a secret search system includes a key generation apparatus, registration apparatuses, search apparatuses, and a management apparatus, and each apparatus is one computer. However, the key generation apparatus and the registration apparatus may be one computer. In addition, the search apparatus and the management apparatus may be one computer. In addition, it does not matter if all apparatuses are implemented by one computer. As long as the functions described in the above-described first to third embodiments can be implemented, it does not matter how the apparatuses in the secret search system are combined to compose the secret search system.

In addition, in each apparatus in the secret search system, of the components described as the "units", only one unit may be adopted or any combination of some units may be adopted. That is, the functional blocks of each apparatus in the secret search system are any as long as the functions described in the above-described first to third embodiments can be implemented. It does not matter how those functional blocks are combined to compose each apparatus. In addition, it does not matter what block configuration those functional blocks use to compose each apparatus.

In addition, of the first to third embodiments, a plurality of embodiments may be partially combined and implemented. Alternatively, of these embodiments, one invention may be partially implemented. In addition to them, it does not matter how these embodiments are combined in whole or in part and implemented.

Note that the above-described embodiments are essentially preferred exemplifications and are not intended to limit the present invention, things to which the present invention is applied, or a range of applications, and various changes may be made thereto as necessary.

REFERENCE SIGNS LIST

100: secret search system, 101: network, 200: key generation apparatus, 201: parameter receiving unit, 202: key generating unit, 209: transmitting unit, 250: key generation memory unit, 300: registration apparatus, 301: receiving unit, 302: key storing unit, 311: input unit, 312: encrypting unit, 319: transmitting unit, 350: registration memory unit, 339: deletion request, 400: search apparatus, 401: receiving unit, 411: input unit, 412: encrypting unit, 419: transmitting unit, 421: key storing unit, 422: auxiliary information storing unit, 439: search result output unit, 450: search memory unit, 451: search history information, 500: management apparatus, 501: receiving unit, 511: key storing unit, 521: data storing unit, 531: high-speed checking unit, 502: checking unit, 509: transmitting unit, 550: management memory unit, 551: encrypted storage data, 552: encrypted data, 553: encrypted tag, 554: high-speed index information, 610: secret search method, 620: secret search program, 909: processing circuit, 910: CPU, 920: memory apparatus, 930: input interface, 940: output interface, 950: communication apparatus, 921: memory, 922: auxiliary memory apparatus, S100: secret search process, S110: key generation and storage process, S120: registration process, S130: search process, S134: search query generation process, S135: determination process, S136: result output process, S140: deletion process, K1 and K2: key, E(D): encrypted data, C(D): encrypted tag, s: search keyword, f: deterministic instruction, t: deterministic information, Q(s): search query, r: first random number, ui: second random number, λ: parameter, 100a: secret search system, 300a: registration apparatus, 400a: search apparatus, 500a: management apparatus, S100a: secret search process, S120a: registration process, S130a: search process, S134a: search query generation process, S135a: determination process, v: random number, 100b: secret search system, 400b: search apparatus, 500b: management apparatus, S100b: secret search process, S130b: search process, S134b: search query generation process, S135b: determination process, Q1: first ciphertext, and Q2: second ciphertext

The invention claimed is:

1. A secret search system comprising:
a management apparatus including a management memory unit, and receiving encrypted data and an encrypted tag and storing, in the management memory unit, the encrypted tag and the encrypted data such that the encrypted tag and the encrypted data are associated with each other, the management memory unit being a memory apparatus, the encrypted data being obtained by encrypting storage data, and the encrypted tag being generated by performing encryption of a probabilistic encryption scheme on an associated keyword associated with the storage data; and
a search apparatus to calculate deterministic information when the search apparatus obtains a search keyword for searching for the encrypted data stored in the management memory unit, generate a search query by performing encryption of the probabilistic encryption scheme on the search keyword using the deterministic information, and transmit the search query to the management apparatus, the deterministic information being uniquely determined by the search keyword, wherein
when the management apparatus receives the search query from the search apparatus, the management apparatus determines whether the search keyword obtained by decrypting the search query matches the associated keyword obtained by decrypting the encrypted tag stored in the management memory unit, and
when the search keyword obtained by decrypting the search query matches the associated keyword obtained by decrypting the encrypted tag, the management apparatus stores, in the management memory unit, the deterministic information and the encrypted data associated with the encrypted tag such that the deterministic information and the encrypted data are associated with each other, the deterministic information being obtained by decrypting the search query.

2. The secret search system according to claim 1, wherein when the search keyword obtained by decrypting the search query matches the associated keyword obtained by decrypting the encrypted tag, the management apparatus transmits a search result including the encrypted data associated with the encrypted tag, to the search apparatus, and
the search apparatus includes a search memory unit, and when the search apparatus receives the search result from the management apparatus, the search apparatus accumulates the deterministic information in the search memory unit, the search memory unit being a memory apparatus.

3. The secret search system according to claim 2, wherein when the search apparatus calculates the deterministic information, the search apparatus determines whether the deterministic information is accumulated in the search memory unit, and when the deterministic information is not accumulated in the search memory unit, the search apparatus transmits the search query to the management apparatus, and when the deterministic information is accumulated in the search memory unit, the search apparatus transmits the deterministic information to the management apparatus, and when the management apparatus receives the deterministic information from the search apparatus, the management apparatus obtains the encrypted data associated with the deterministic information from the management memory unit, and transmits a search result including the obtained the encrypted data to the search apparatus.

4. The secret search system according to claim 1, wherein the search apparatus calculates the deterministic information by performing encryption of a deterministic encryption scheme on the search keyword.

5. The secret search system according to claim 1, wherein the search apparatus obtains a deterministic instruction instructing whether to use the deterministic information upon encrypting the search keyword, and when an instruction to use the deterministic information is given by the deterministic instruction, the search apparatus performs encryption of the probabilistic encryption scheme on the search keyword using the deterministic information, and when an instruction not to use the deterministic information is given by the deterministic instruction, the search apparatus performs encryption of the probabilistic encryption scheme on the search keyword without using the deterministic information.

6. The secret search system according to claim 1, further comprising a registration apparatus to generate a first random number, generate the encrypted tag by performing encryption of the probabilistic encryption scheme on the associated keyword using the first random number, and transmit the encrypted tag and the encrypted data to the management apparatus, and transmit the first random number to the search apparatus, wherein
the search apparatus generates a second random number and performs encryption of the probabilistic encryption scheme on the search keyword using the second random number, the first random number received from the registration apparatus, and the deterministic information.

7. The secret search system according to claim 1, wherein the management apparatus receives a deletion request for deleting the encrypted data stored in the management memory unit, and deletes the encrypted data from the management memory unit based on the deletion request.

8. A secret search method for a secret search system including a management apparatus including a management memory unit; and a search apparatus, the management memory unit being a memory apparatus, wherein
the management apparatus receives encrypted data and an encrypted tag and stores, in the management memory unit, the encrypted tag and the encrypted data such that the encrypted tag and the encrypted data are associated with each other, the encrypted data being obtained by encrypting storage data, and the encrypted tag being generated by performing encryption of a probabilistic encryption scheme on an associated keyword associated with the storage data,
the search apparatus calculates deterministic information when the search apparatus obtains a search keyword for searching for the encrypted data stored in the management memory unit, generates a search query by performing encryption of the probabilistic encryption scheme on the search keyword using the deterministic information, and transmits the search query to the management apparatus, the deterministic information being uniquely determined by the search keyword,
when the management apparatus receives the search query from the search apparatus, the management apparatus determines whether the search keyword obtained by decrypting the search query matches the associated keyword obtained by decrypting the encrypted tag stored in the management memory unit, and
when the search keyword obtained by decrypting the search query matches the associated keyword obtained by decrypting the encrypted tag, the management apparatus stores, in the management memory unit, the deterministic information and the encrypted data associated with the encrypted tag such that the deterministic information and the encrypted data are associated with each other, the deterministic information being obtained by decrypting the search query.

9. A non-transitory computer readable medium storing a secret search program for a secret search system including a management apparatus including a management memory unit; and a search apparatus, the management memory unit being a memory apparatus, the secret search program causing a computer to perform:
a data storage process of receiving encrypted data and an encrypted tag and storing, in the management memory unit, the encrypted tag and the encrypted data such that the encrypted tag and the encrypted data are associated with each other, the encrypted data being obtained by encrypting storage data, and the encrypted tag being generated by performing encryption of a probabilistic encryption scheme on an associated keyword associated with the storage data,
a search query generation process of calculating deterministic information when a search keyword for searching for the encrypted data stored in the management memory unit is obtained, generating a search query by performing encryption of the probabilistic encryption scheme on the search keyword using the deterministic information, and transmitting the search query to the management apparatus, the deterministic information being uniquely determined by the search keyword,
a determination process of determining, when the search query is received from the search apparatus, whether the search keyword obtained by decrypting the search query matches the associated keyword obtained by decrypting the encrypted tag stored in the management memory unit, and
a deterministic information storage process of storing, when the search keyword obtained by decrypting the search query matches the associated keyword obtained by decrypting the encrypted tag, the deterministic information and the encrypted data associated with the encrypted tag in the management memory unit such that the deterministic information and the encrypted data are associated with each other, the deterministic information being obtained by decrypting the search query.

10. A secret search system comprising:
a management apparatus including a management memory unit, and receiving encrypted data and an encrypted tag and storing, in the management memory unit, the encrypted tag and the encrypted data such that the encrypted tag and the encrypted data are associated with each other, the management memory unit being a memory apparatus, the encrypted data being obtained by encrypting storage data, and the encrypted tag being generated by encrypting an associated keyword associated with the storage data; and a search apparatus to calculate deterministic information when the search apparatus obtains a search keyword for searching for the encrypted data stored in the management memory unit, generate a search query by performing encryption of a probabilistic encryption scheme on the search keyword using the deterministic information, and transmit the search query to the management apparatus, the deterministic information being uniquely determined by the search keyword, wherein when the management apparatus receives the search query from the search apparatus, the management apparatus determines whether the search keyword obtained by decrypting the search query matches the associated keyword obtained by decrypting the encrypted tag stored in the management memory unit, and when the search keyword obtained by decrypting the search query matches the associated keyword obtained by decrypting the encrypted tag, the management apparatus stores, in the management memory unit, the deterministic information and the encrypted data associated with the encrypted tag such that the deterministic information and the encrypted data are associated with each other, the deterministic information being obtained by decrypting the search query.

11. The secret search system according to claim 10, wherein when the search keyword obtained by decrypting the search query matches the associated keyword obtained by decrypting the encrypted tag, the management apparatus transmits a search result including the encrypted data associated with the encrypted tag, to the search apparatus, and the search apparatus includes a search memory unit, and when the search apparatus receives the search result from the management apparatus, the search apparatus accumulates the deterministic information in the search memory unit, the search memory unit being a memory apparatus.

12. The secret search system according to claim 11, wherein when the search apparatus calculates the deterministic information, the search apparatus determines whether the deterministic information is accumulated in the search memory unit, and when the deterministic information is not accumulated in the search memory unit, the search apparatus transmits the search query to the management apparatus, and when the deterministic information is accumulated in the search memory unit, the search apparatus transmits the deterministic information to the management apparatus, and when the management apparatus receives the deterministic information from the search apparatus, the management apparatus obtains the encrypted data associated with the deterministic information from the management memory unit, and transmits a search result including the obtained the encrypted data to the search apparatus.

13. The secret search system according to claim 10, wherein the search apparatus calculates the deterministic information by performing encryption of a deterministic encryption scheme on the search keyword.

14. The secret search system according to claim 10, wherein the search apparatus obtains a deterministic instruction instructing whether to use the deterministic information upon encrypting the search keyword, and when an instruction to use the deterministic information is given by the deterministic instruction, the search apparatus performs encryption of the probabilistic encryption scheme on the search keyword using the deterministic information, and when an instruction not to use the deterministic information is given by the deterministic instruction, the search apparatus performs encryption of the probabilistic encryption scheme on the search keyword without using the deterministic information.

15. The secret search system according to claim 10, further comprising a registration apparatus to generate a counter value, generate the encrypted tag by encrypting the associated keyword using the counter value, and transmit the encrypted tag and the encrypted data to the management apparatus, wherein the search apparatus generates a random number and performs encryption of the probabilistic encryption scheme on the search keyword, using the random number and the counter value generated by the registration apparatus.

16. The secret search system according to claim 15, wherein the search apparatus performs encryption of the probabilistic encryption scheme on the search keyword using the random number and the counter value, to generate a first ciphertext to determine whether the first ciphertext matches the encrypted tag, and a second ciphertext for calculating the deterministic information using the encrypted tag that matches the first ciphertext.

17. A secret search method for a secret search system including a management apparatus including a management memory unit; and a search apparatus, the management memory unit being a memory apparatus, wherein the management apparatus receives the encrypted data and an encrypted tag and stores, in the management memory unit, the encrypted tag and the encrypted data such that the encrypted tag and the encrypted data are associated with each other, the encrypted data being obtained by encrypting storage data, and the encrypted tag being generated by encrypting an associated keyword associated with the storage data, the search apparatus calculates deterministic information when the search apparatus obtains a search keyword for searching for the encrypted data stored in the management memory unit, generates a search query by performing encryption of a probabilistic encryption scheme on the search keyword using the deterministic information, and transmits the search query to the management apparatus, the deterministic information being uniquely determined by the search keyword, when the management apparatus receives the search query from the search apparatus, the management apparatus determines whether the search keyword obtained by decrypting the search query matches the associated keyword obtained by decrypting the encrypted tag stored in the management memory unit, and when the search keyword obtained by decrypting the search query matches the associated keyword obtained by decrypting the encrypted tag, the management apparatus stores, in the management memory unit, the deterministic information and the encrypted data associated with the encrypted tag such that the deterministic information and the encrypted data are associated with each other, the deterministic information being obtained by decrypting the search query.

18. A non-transitory computer readable medium storing a secret search program for a secret search system including a management apparatus including a management memory unit; and a search apparatus, the management memory unit being a memory apparatus, the secret search program causing a computer to perform:

a data storage process of receiving encrypted data and an encrypted tag and storing, in the management memory unit, the encrypted tag and the encrypted data such that the encrypted tag and the encrypted data are associated with each other, the encrypted data being obtained by encrypting storage data, and the encrypted tag being generated by encrypting an associated keyword associated with the storage data, a search query generation process of calculating deterministic information when a search keyword for searching for the encrypted data stored in the management memory unit is obtained, generating a search query by performing encryption of a probabilistic encryption scheme on the search keyword using the deterministic information, and transmitting the search query to the management apparatus, the deterministic information being uniquely determined by the search keyword, a determination process of determining, when the search query is received from the search apparatus, whether the search keyword obtained by decrypting the search query matches the associated keyword obtained by decrypting the encrypted tag stored in the management memory unit, and a deterministic information storage process of storing, when the search keyword obtained by decrypting the search query matches the associated keyword obtained by decrypting the encrypted tag, the deterministic information and the encrypted data associated with the encrypted tag in the management memory unit such that the deterministic information and the encrypted data are associated with each other, the deterministic information being obtained by decrypting the search query.

* * * * *